(12) United States Patent
Titchener et al.

(10) Patent No.: US 8,935,212 B2
(45) Date of Patent: Jan. 13, 2015

(54) DISCOVERY OF NON-STANDARD FOLDERS FOR BACKUP

(75) Inventors: Thomas B. Titchener, Concord, MA (US); Robert Ian Morgan, North Andover, MA (US)

(73) Assignee: Carbonite, Inc., Boston, MA (US)

( * ) Notice: Subject to any disclaimer, the term of this patent is extended or adjusted under 35 U.S.C. 154(b) by 43 days.

(21) Appl. No.: 13/638,559

(22) PCT Filed: Mar. 29, 2010

(86) PCT No.: PCT/US2010/029008
§ 371 (c)(1),
(2), (4) Date: Oct. 16, 2012

(87) PCT Pub. No.: WO2011/123090
PCT Pub. Date: Oct. 6, 2011

(65) Prior Publication Data
US 2013/0036095 A1 Feb. 7, 2013

(51) Int. Cl.
*G06F 17/00* (2006.01)
*G06F 11/14* (2006.01)

(52) U.S. Cl.
CPC ........ *G06F 11/1451* (2013.01); *G06F 11/1458* (2013.01); *G06F 11/1464* (2013.01); *G06F 11/1469* (2013.01)
USPC .................. 707/654; 707/668; 707/E17.005; 715/764; 715/700

(58) Field of Classification Search
CPC ............ G06F 11/1469; G06F 11/1458; G06F 17/30067
USPC .................. 707/654, 679, E17.032, E17.005; 715/700, 764; 455/566
See application file for complete search history.

(56) References Cited

U.S. PATENT DOCUMENTS 5,495,607 A * 2/1996 Pisello et al. ................. 707/797
5,678,042 A * 10/1997 Pisello et al. ................. 714/47.3

(Continued)

FOREIGN PATENT DOCUMENTS

WO WO-2007/059174 5/2007

OTHER PUBLICATIONS

Hellerstein, J.L. ; IBM Res. Div., Yorktown Heights, NY, USA ; Tummalapalli, V.R.—"Using multidimensional databases for problem determination and planning of a networked application"—Published in: Systems Management, 1998. Proceedings of the IEEE Third International Workshop on; Apr. 22-24, 1998—pp. 117-126.*

(Continued)

*Primary Examiner* — Anh Ly
(74) *Attorney, Agent, or Firm* — Foley and Lardner LLP; John D. Lanza

(57) ABSTRACT

The identifying folder paths for backup techniques include a method, a system, and/or a computer software product. In some embodiments of these techniques, the method includes scanning a client device for folders. The method further includes identifying one or more folder paths on a client device according to a pre-defined criteria associated with a backup policy for the client device. The method further includes consolidating the one or more folder paths into a consolidated list of folder paths. The method further includes presenting the consolidated list of one or more folder paths to a user. This Abstract is provided for the sole purpose of complying with the Abstract requirement rules. This Abstract is submitted with the explicit understanding that it will not be used to interpret or to limit the scope or the meaning of the claims.

18 Claims, 21 Drawing Sheets

(56) References Cited

U.S. PATENT DOCUMENTS

| | | | |
|---|---|---|---|
| 6,134,660 A * | 10/2000 | Boneh et al. | 713/193 |
| 6,611,850 B1 | 8/2003 | Shen | |
| 7,466,320 B2 * | 12/2008 | Bocking | 345/589 |
| 7,660,808 B2 * | 2/2010 | Brechner et al. | 707/999.102 |
| 8,073,815 B1 * | 12/2011 | Korshunov et al. | 707/636 |
| 8,386,430 B1 * | 2/2013 | Myhill et al. | 707/640 |
| 2003/0120685 A1 | 6/2003 | Duncombe et al. | 707/200 |
| 2004/0252198 A1 * | 12/2004 | Hatanaka | 348/207.1 |
| 2005/0027757 A1 * | 2/2005 | Kiessig et al. | 707/204 |
| 2005/0207337 A1 | 9/2005 | Oda et al. | |
| 2005/0246631 A1 * | 11/2005 | Mori et al. | 715/515 |
| 2006/0036568 A1 * | 2/2006 | Moore et al. | 707/1 |
| 2006/0064638 A1 * | 3/2006 | Bocking | 715/700 |
| 2006/0195461 A1 * | 8/2006 | Lo et al. | 707/100 |
| 2007/0038681 A1 * | 2/2007 | Pierce et al. | 707/201 |
| 2007/0130233 A1 * | 6/2007 | Christensen | 707/204 |
| 2007/0252724 A1 * | 11/2007 | Donaghey et al. | 340/905 |
| 2007/0276885 A1 | 11/2007 | Valiyaparambil et al. | |
| 2008/0042871 A1 * | 2/2008 | Donaghey et al. | 340/870.01 |
| 2008/0059495 A1 * | 3/2008 | Kiessig et al. | 707/E17.005 |
| 2008/0104145 A1 * | 5/2008 | Lipman et al. | 707/204 |
| 2008/0115071 A1 * | 5/2008 | Fair | 715/764 |
| 2008/0125877 A1 * | 5/2008 | Miller et al. | 700/29 |
| 2008/0126442 A1 * | 5/2008 | Cisler et al. | 707/204 |
| 2008/0306954 A1 * | 12/2008 | Hornqvist | 707/9 |
| 2009/0019023 A1 * | 1/2009 | Arrouye et al. | 707/E17.014 |
| 2009/0112881 A1 * | 4/2009 | Kodama | 707/10 |
| 2009/0183254 A1 * | 7/2009 | Franco et al. | 726/17 |
| 2009/0264158 A1 * | 10/2009 | Bocking | 455/566 |
| 2013/0173530 A1 * | 7/2013 | Laron | 707/608 |

OTHER PUBLICATIONS

Nitin Agrawal, William J. Bolosky, John R. Douceur, Jacob R. Lorch—"A five-year study of file-system metadata"—Journal ACM Transactions on Storage (TOS) TOS Homepagearchive—vol. 3 Issue 3, Oct. 2007 Article No. 9—pp. 9:1-9:32.*

International Search Report on PCT/US2010/029008 dated Dec. 23, 2010.

Written Opinion on PCT/US2010/029008 dated Dec. 23, 2010.

* cited by examiner

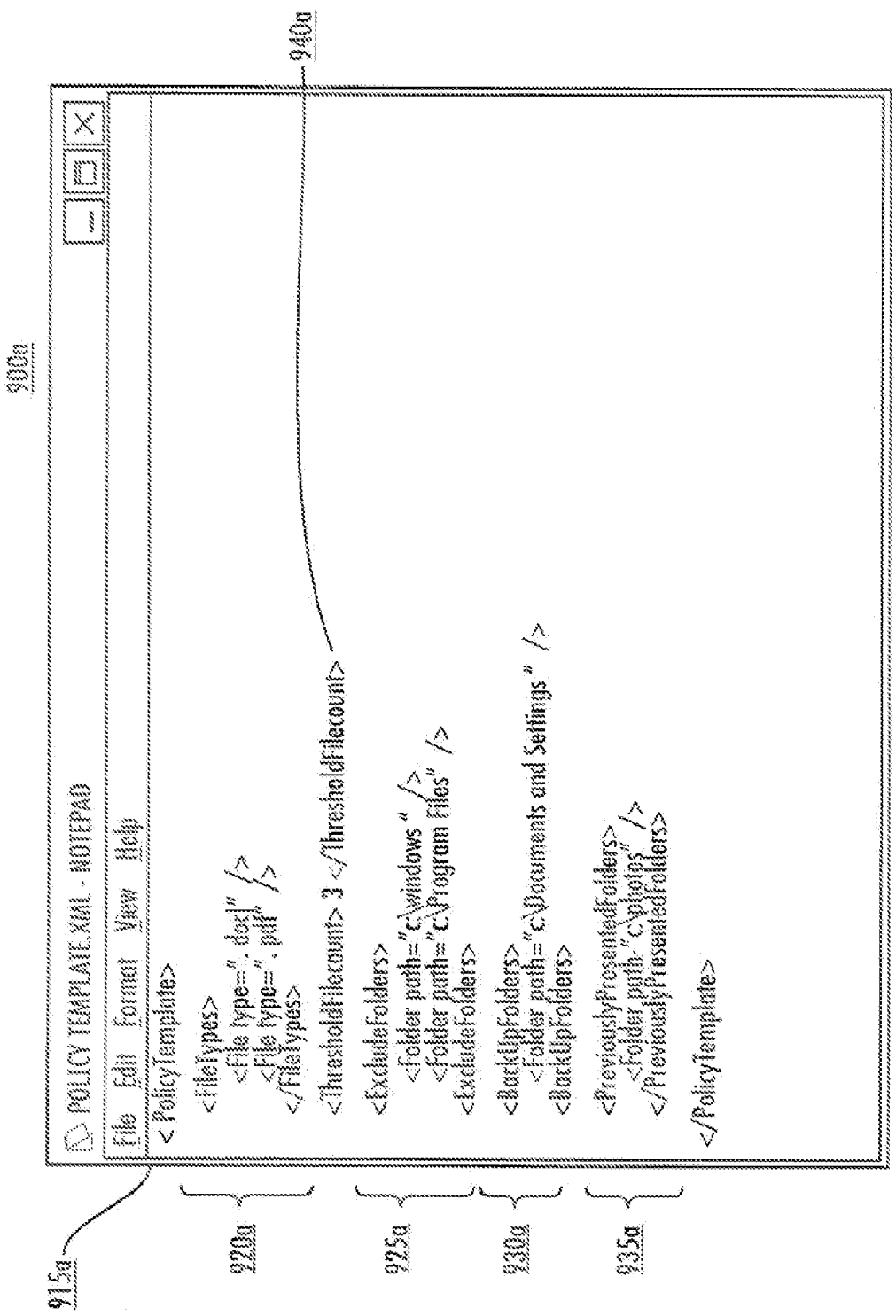

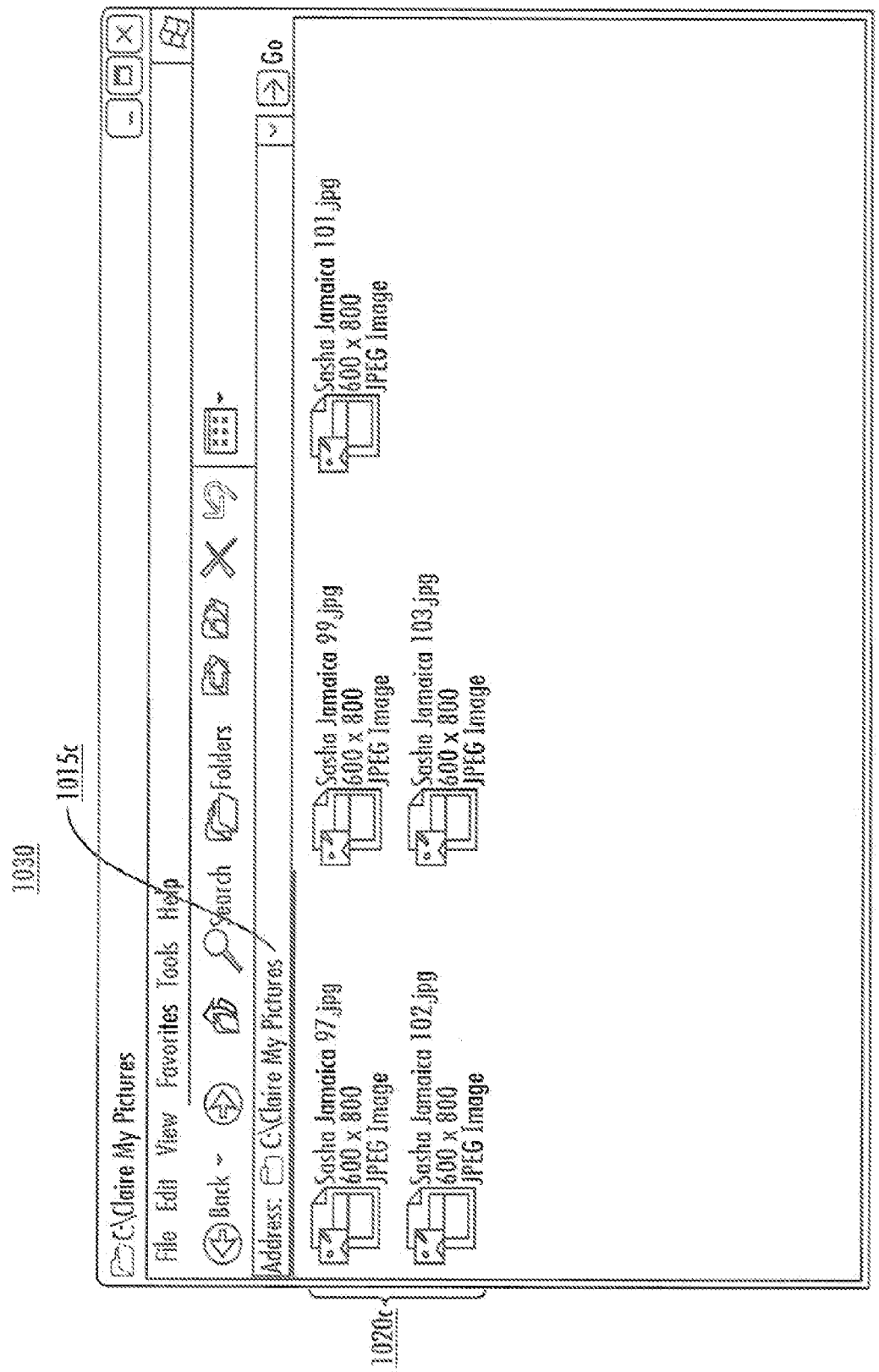

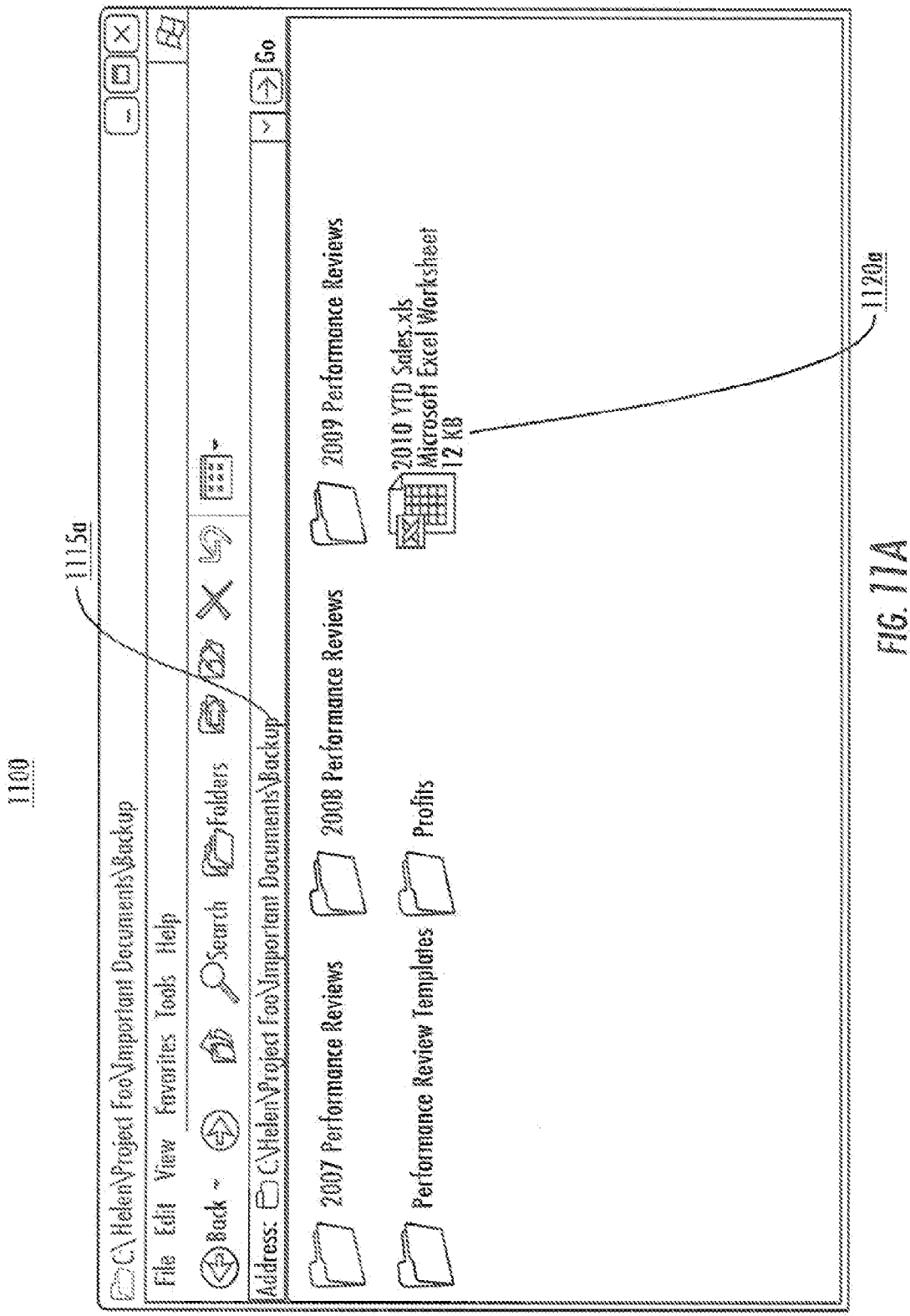

DISCOVERY OF NON-STANDARD FOLDERS FOR BACKUP

RELATED APPLICATIONS

The present application claims priority to and is a national phase entry under 35 U.S.C. §371 of co-pending International Application No. PCT/US2010/0290028 entitled "Discovery of Non-Standard Folders for Backup," filed Mar. 29, 2010 and designating the United States, the entirety of which is hereby incorporated by reference.

FIELD OF THE INVENTION

The present invention relates generally to computer-based methods and apparatuses, including computer program products, for managing backup of user data.

BACKGROUND

Computer systems are ubiquitous in today's work and home environments. The data stored on these computer systems, however, is vulnerable to theft, fire, flood, and other natural disasters. Users may customize folder organization on their computing devices in non-standard ways such that important data may be located in non-standard locations. As a result, backup services running on users' computing devices may not be backing up important data located in non-standard locations. Users may only realize that data located in a non-standard location was not backed up after the data is lost (e.g., due to disk failure). Thus, a need exists for a system that discovers data in non-standard locations and allows users to backup this data.

SUMMARY

One approach to identifying folder paths for backup is a method. The method includes scanning a client device for folders. The method further includes identifying one or more folder paths on a client device according to a pre-defined criteria associated with a backup policy for the client device. The method further includes consolidating the one or more folder paths into a consolidated list of folder paths. The method further includes presenting the consolidated list of one or more folder paths to a user.

Another approach to identifying folder paths for backup is a system. The system includes a folder discovery module. The folder discovery module is configured to scan a client device for folders, identify one or more folder paths on a client device according to a pre-defined criteria associated with a backup policy for the client device, and consolidate the one or more folder paths into a consolidated list of folder paths. The system further includes an application module. The application module is configured to present the consolidated list of one or more folder paths to a user.

Another approach to identifying folder paths for backup is a computer software product. The computer software product includes a non-transitory computer readable medium. The non-transitory computer readable medium includes a set of processor executable instructions. When executed by a processor, the instructions configure a computing apparatus to scan a client device for folders, identify one or more folder paths on a client device according to a pre-defined criteria associated with a backup policy for the client device, consolidate the one or more folder paths into a consolidated list of folder paths, and present the consolidated list of one or more folder paths to a user.

Another approach to identifying folder paths for backup is a system for identifying folder paths for backup. The system includes a means for scanning a client device for folders. The system includes a means for identifying one or more folder paths on a client device according to a pre-defined criteria associated with a backup policy for the client device. The system includes a means for consolidating the one or more folder paths into a consolidated list of folder paths. The system includes a means for presenting the consolidated list of one or more folder paths to a user.

Other aspects and advantages of the present invention will become apparent from the following detailed description, taken in conjunction with the accompanying drawings, illustrating the principles of the invention by way of example only.

BRIEF DESCRIPTION OF THE DRAWINGS

Various embodiments taught herein are illustrated by way of example, and not by way of limitation, in the figures of the accompanying drawings, in which:

FIGS. 9A-9B illustrate exemplary backup policies;

FIGS. 10A-C illustrate exemplary folders stored on the client device;

FIGS. 11A-E illustrate exemplary folders stored on the client device;

It will be recognized that some or all of the figures are schematic representations for purposes of illustration and do not necessarily depict the actual relative sizes or locations of the elements shown. The figures are provided for the purpose of illustrating one or more embodiments of the invention with the explicit understanding that they will not be used to limit the scope or the meaning of the claims.

DETAILED DESCRIPTION

This technology discloses a method for discovering folders and prompting a user with summation of folder paths with a suggestion to select the discovered folders for future backups. To make the user interactions easier, the discovered folder path may be consolidated as described below. In the disclosed example, the discovery of folders may be driven by a template policy containing information regarding what types of files may be of interest to the user, as well as various lists of folders that should be excluded from the search. The method may also keep track of folders that have previously been presented to the user.

Before turning to the figures which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Figure 1:
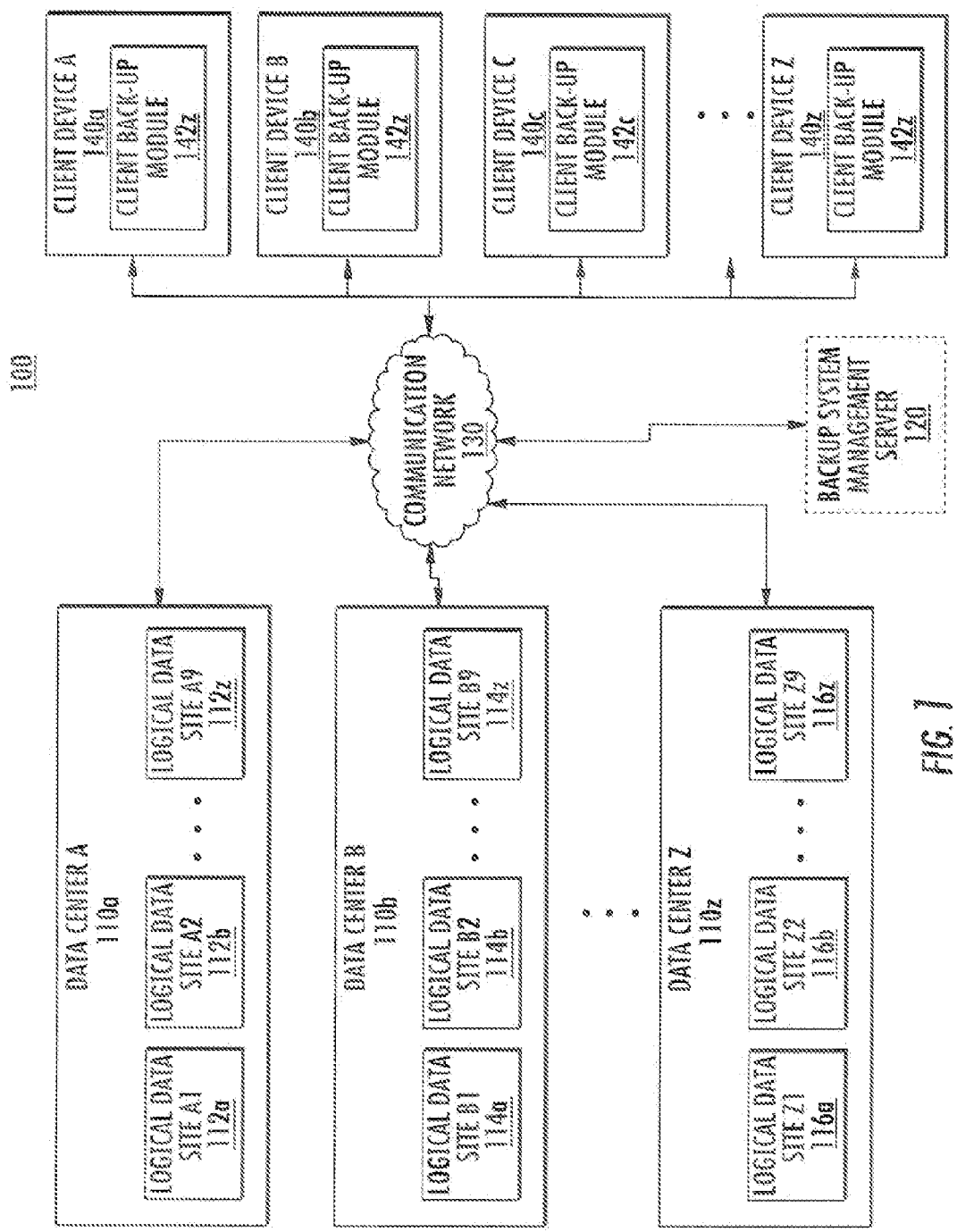
FIG. 1 is a block diagram illustrating an exemplary system, according to one exemplary embodiment.

FIG. 1 illustrates an exemplary system 100 for backup and restoration of user data (e.g., one or more document files, one or more audio files, etc.) between client devices A 140a, B 140b, C 140c through Z 140z (e.g., personal computer, server computing system, personal digital assistant, phone, music player, etc.) and data centers A 110a, B 110b through Z 110z (e.g., server systems with a plurality of data storage devices, server systems connected to a plurality of network data storage devices, etc.). The system 100 includes a communication network 130 (e.g., internet protocol (IP) network, a local area network (LAN), internet, etc.) and a backup system management server 120.

Each data center A 110a, B 110b through Z 110z includes a plurality of logical data sites 1, 2 through 9, 112a, 112b through 112z, 114a, 114b through 114z, and 116a, 116b, through 116z, respectively. Each client device A 140a, B 140b, C 140c through Z 140z includes a client backup module 142a, 142b, 142c, through 142z, respectively. The data centers 110a-110z, the client devices 140a-140z, and/or the backup system management server 120 communicate via the communication network 130.

The backup system management server 120 can manage the backup of user data from the client devices 140a-140z to one or more of the logical data sites at one or more of the data centers 110a-110z. The backup system management server 120 can manage the restoration of user data from one or more of the logical data sites at one or more of the data centers 110a-110z to the client devices 140a-140z. The backup system management server 120 can communicate with the client backup module 142a-142z on each client device 140a-140z to manage the backup and/or restoration of the user data (e.g., pause backup, start backup, select backup set, start restoration, schedule backup, communicate a backup policy, update a backup set, etc.).

In some examples, the restoration of the user data is to the originating client device (e.g., the client device from which the user data originated from, the client device connected to the computing device which the user data originated from, etc.). In other examples, the restoration of the user data is to another client device that is not the originating client device (e.g., new user computer, etc.).

In other examples, each data center 110a-110z includes a data center management server (not shown) for managing the backup and/or the restoration of the user data. In some examples, each logical site includes a site management server for managing the backup and/or the restoration of the user data. In other examples, the backup system management server 120 manages the backup and/or the restoration of the user data by managing one or more of the data center management servers and/or one or more of the site management servers.

Although FIG. 1 illustrates a single communication network 130, the system can include a plurality of communication networks and/or the plurality of communication networks can be configured in a plurality of ways (e.g., a plurality of interconnected local area networks (LAN), a plurality of interconnected wide area network (WAN), a plurality of interconnected LANs and/or WANs, etc.).

Although FIG. 1 illustrates the data centers A 110a, B 110b through Z 110z, the logical data sites 1, 2 through 9 (e.g. 112a-112z), and the client device A 140a, B 140b, C 140c through Z 140z, the system 100 can include any number of data centers, logical data sites, and/or client devices. In some examples, data centers A, B, and C include ten logical data sites and data centers D, E, F, and G include twenty logical data sites. In other examples, ten thousand client devices are associated with each logical data site. In this example, data center G is associated with two hundred thousand client devices since data center G includes twenty logical data sites and each logical data site is associated with ten thousand client devices.

Figure 2:
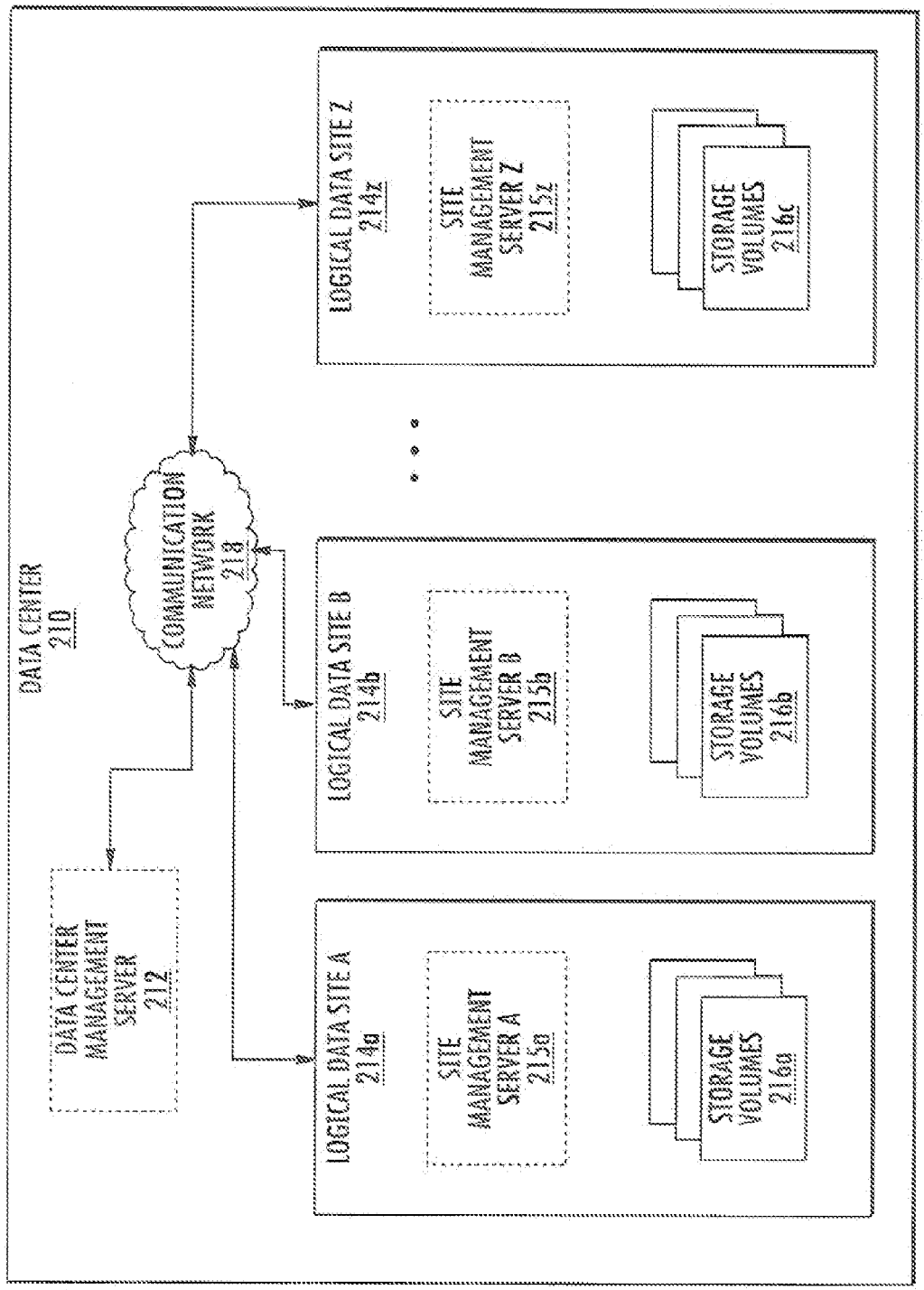
FIG. 2 is a block diagram illustrating an exemplary data center, according to one exemplary embodiment.

FIG. 2 illustrates an exemplary data center 210. The data center 210 includes a data center management server 212, logical data sites A 214a, B 214b through Z 214z, and a communication network 218. Each logical data site A 214a, B 214b through Z 214z includes a site management server A 215a, B 215b through Z 215z and one or more storage volumes 216a, 216b through 216z (e.g., logical storage volumes, storage devices, distributed storage devices, etc.). The data center management server 212 and/or the site manager servers 215a, 215b through 215z can manage the plurality of logical data sites 214a-214z.

Each logical data site A 214a, B 214b through Z 214z can store and/or retrieve the backup of user data associated with a plurality of users (e.g., subscribers to a backup subscription service, users in a corporate network, etc.). The storage volumes 216a-216z at each logical site 214a-214z can store and/or retrieve the backup of the user data.

In some examples, the backup of the user data is stored on a single storage volume (e.g., single storage device, single logical storage volume, redundant array of inexpensive disks (RAID) storage device, etc.). In other examples, the backup of the user data is stored on one or more storage volumes (e.g., distributed backup among a plurality of storage devices, redundant backup among a plurality of logical storage volumes, redundant backup among a plurality of RAID storage devices, etc.).

In some examples, the data center management server 212 manages the backup and/or the restoration for the data center 210 and the site manager server manages the storage and/or retrieval at the respective logical data site.

Although FIG. 2 illustrates a data center 210 with the logical data sites A 214a, B 214b through Z 214z, the data center 210 can include a single logical data site or any number of logical data sites (e.g., twenty, forty, one hundred, etc.). Although FIG. 2 illustrates the data center management server 212 and/or the site management server, the storage and/or retrieval of the backups of user data can be managed individually by either the data center management server 212 or the site management server at each respective logical site.

Figure 3:
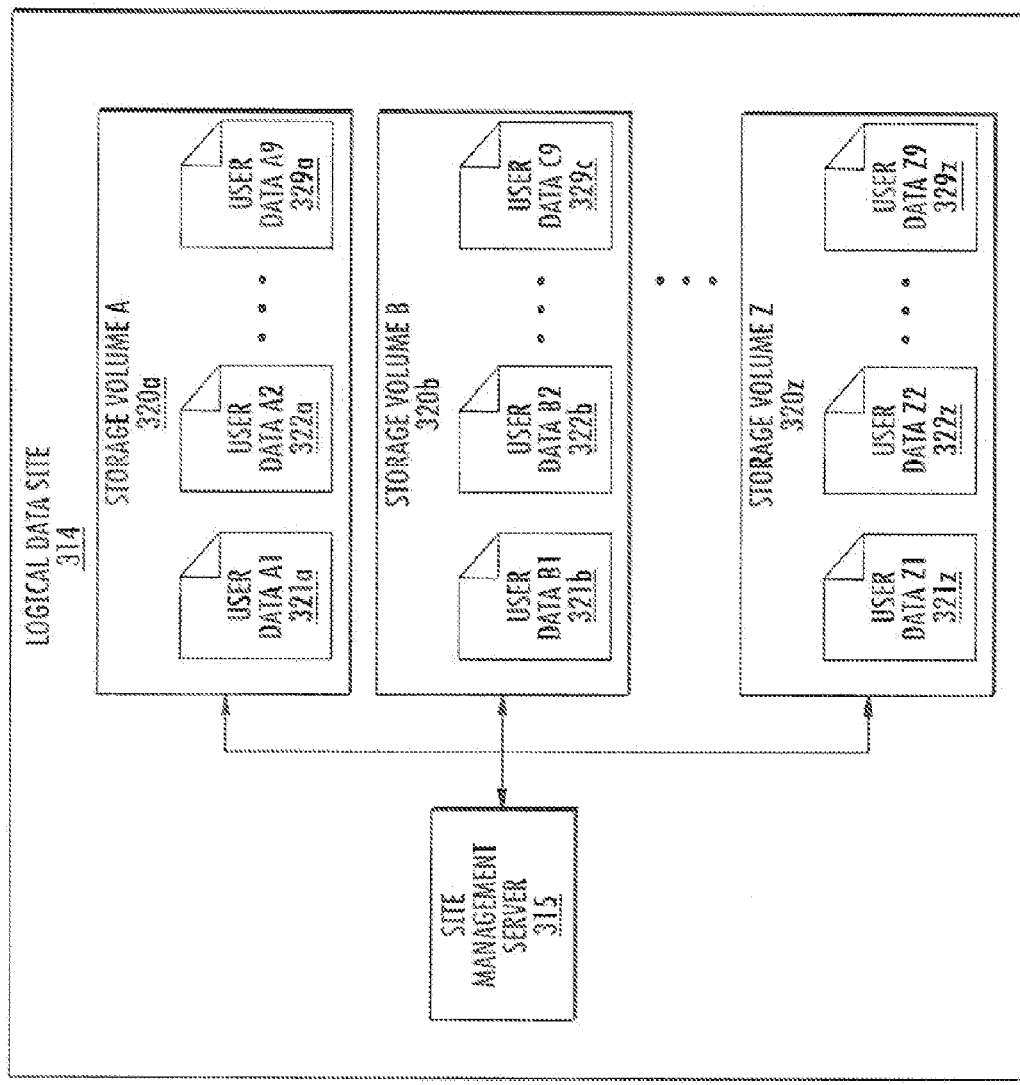
FIG. 3 is block diagram illustrating an exemplary logical data site, according to one exemplary embodiment.

FIG. 3A illustrates a logical data site 304. The logical data site 304 includes a site management server 305 and storage servers A 310a, B 314b through Z 320z. The storage server A 310a includes a storage volume A 312a. The storage server B 314b includes a storage volume B1 316b and a storage volume B2 318b. The storage server Z 320z includes storage volumes Z1 322z through Z3 328z. Any number of storage volumes can be grouped within a storage server. Each storage volume includes a plurality of user data backup (not shown). The site management server 305 can communicate with the storage servers A 310a, B 314b through Z 320z to backup and/or restore the backup of the user data.

Although FIG. 3A illustrates storage servers A 310a, B 314b through Z 320z and storage volumes 312a, 316b, 318b, 322z through 328z, the logical data site 304 can include any number of storage servers and/or storage volumes. For example, the logical data site 304 can include four storage servers and each storage server includes forty storage volumes.

In some embodiments, the site management server 305 can include a database server and a server managing storage bandwidth resources for the logical data site 304. In these embodiments, the site management server 305 can control one or more communications servers that act as intermediary between client communication module 805 and the storage servers A 310a, B 314b through Z 320z, FIG. 3B illustrates a logical data site 334. The logical data site 334 includes a site management server 335 and a storage server 320. The storage server 320 includes storage volumes A 330a, B 330b through Z 330z. Each storage volume A 330a, B 330b through Z 330z includes plurality of user data 1, 2 through 9 (e.g., the user data is the backup of the user data stored on a client device associated with the user). The site management server 335 can communicate with the storage server 320 and/or the storage volumes A 330a, B 330b through Z 330z to backup and/or restore the backup of the user data.

In some examples, the site management server 335 can communicate with the storage volumes to transfer user data between the storage volumes. In some examples, the site management server 335 can communicate with one or more site management servers (not shown) at one or more other logical data sites (not shown) to transfer user data between the logical data sites.

Although FIG. 3B illustrates storage volumes A 330a, B 330b through Z 330z and user data 1, 2 through 9, the logical data site 334 can include any number of storage volumes and/or user data. For example, the logical data site 334 can include twenty storage volumes and each storage volume includes user data associated with one thousand users.

Figure 4:
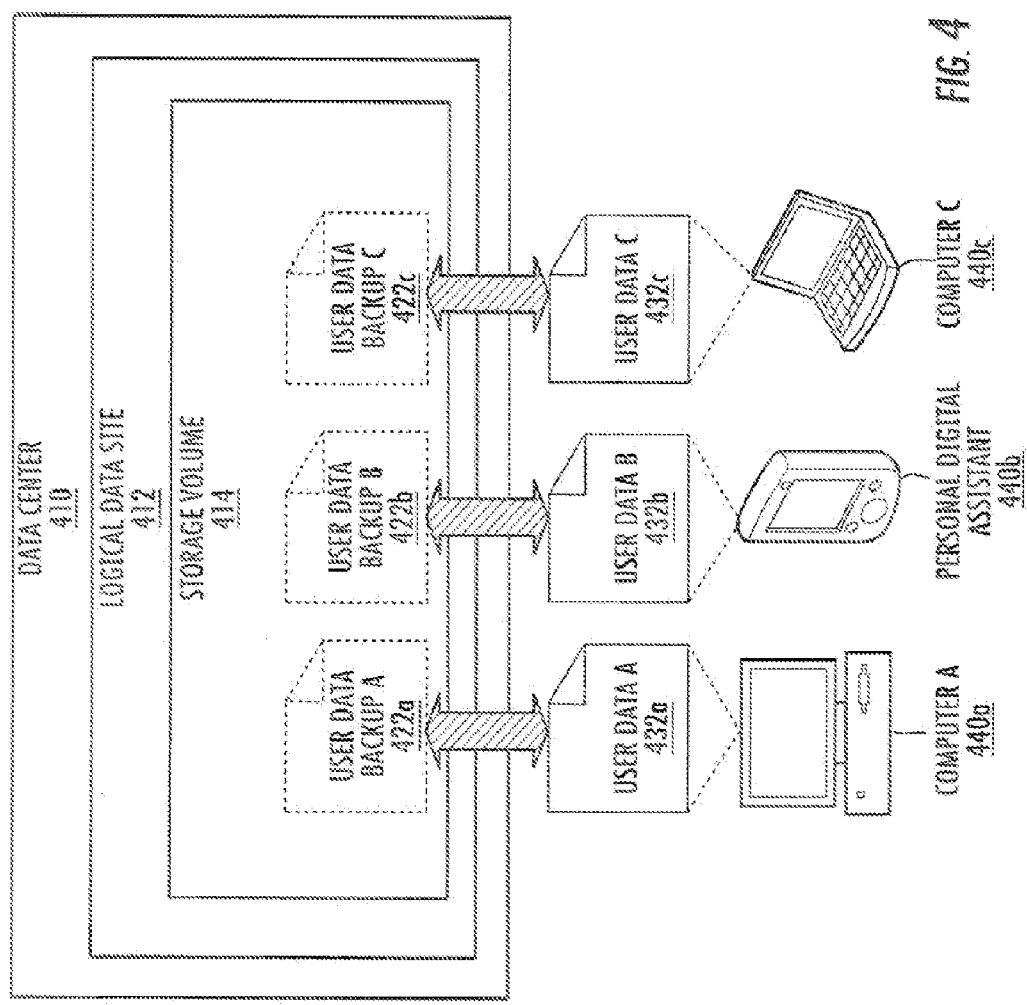
FIG. 4 is a block diagram illustrating an exemplary data center storing user data backup from client devices, according to one exemplary embodiment.

FIG. 4 illustrates an exemplary data center 410 for the backup of user data from one or more client devices 440a, 440b, and 440c. The data center 410 includes a logical data site 412. The logical data site 412 includes a storage volume 414. The storage volume 434 includes user data backups A 432a, B 432b, and C 432c. The user data backups A 422a, B 422b, and C 422c correspond to user data A 432a, B 432b, and C 432c, respectively. The user data A 432a, B 432b, and C 432c are stored on the client devices, computer A 440a, personal digital assistant 440b, and computer B 440c, respectively. As illustrated in FIG. 4, the user data A 432a, B 432b, and C 432c stored on the client devices is backed up to the storage volume 414 on the logical data site 412 in the data center 410.

Figure 5:
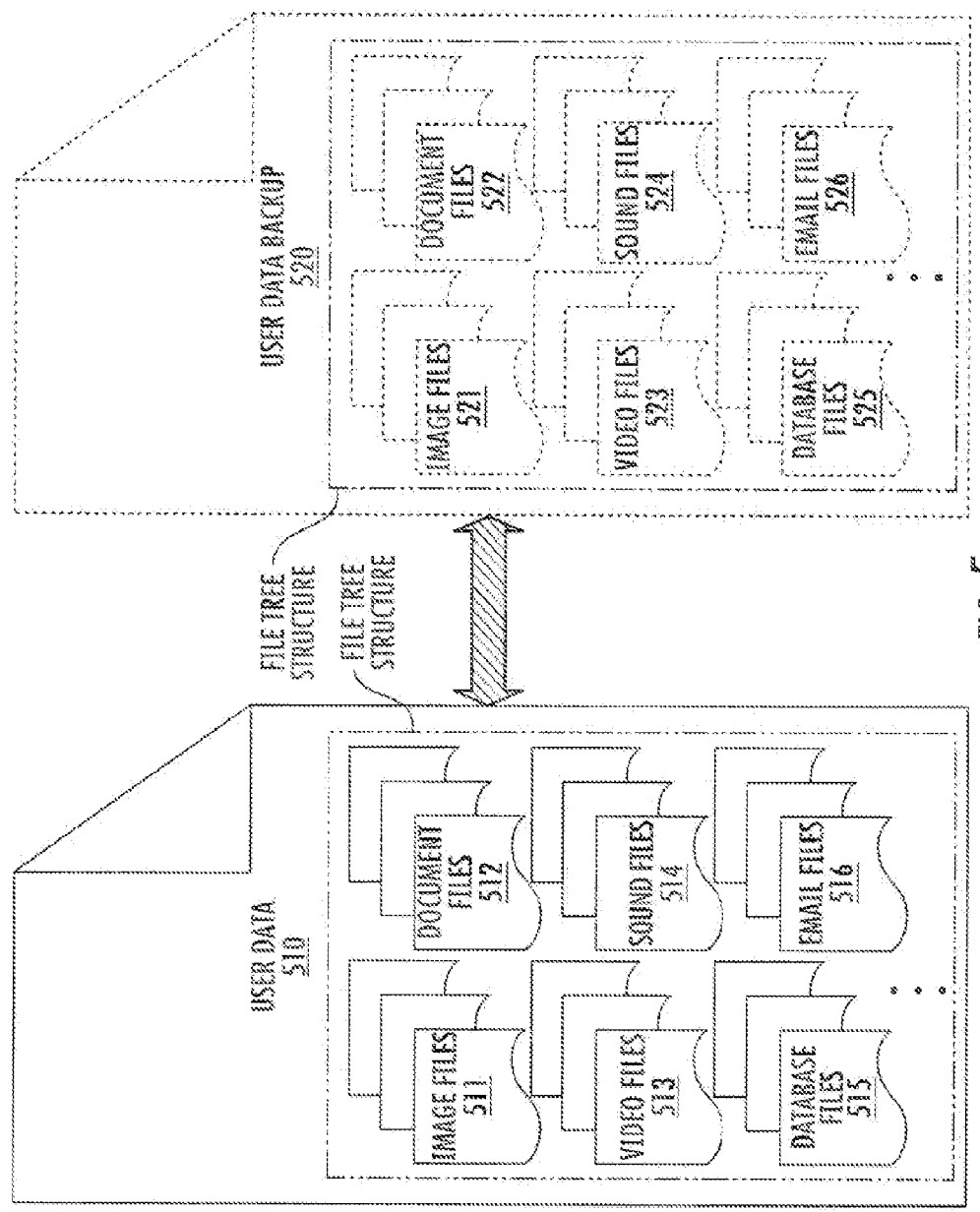
FIG. 5 illustrates exemplary user data and user data backup, according to one exemplary embodiment.

FIG. 5 illustrates exemplary user data 510 and user data backup 520. The user data 510 includes a plurality of files, image files 511, document files 512, video files 513, sound files 514, database files 515, and email files 516, and/or other information (e.g., registry information, user preference information, etc.) stored on a client device in a file tree structure (e.g., hierarchal database, hierarchal flat file, etc.). The user data backup 520 includes a plurality of files, image files 521, document files 522, video files 523, sound files 524, database files 525, and e a files 526, and/or other information that is selected for backup by the user, automatically by the management server (e.g., site management server, data center management server, etc.), and/or based on backup templates and/or backup policies. The technology as described herein can be utilized to backup the user data as the user data backup.

Although FIG. 5 illustrates certain types of files e.g., image files, document files, etc.), the technology as described herein can backup any type of information and/or data stored on the client device and/or a storage device connected to the client device (e.g., external storage device, network connected storage device, etc.).

Figure 6:
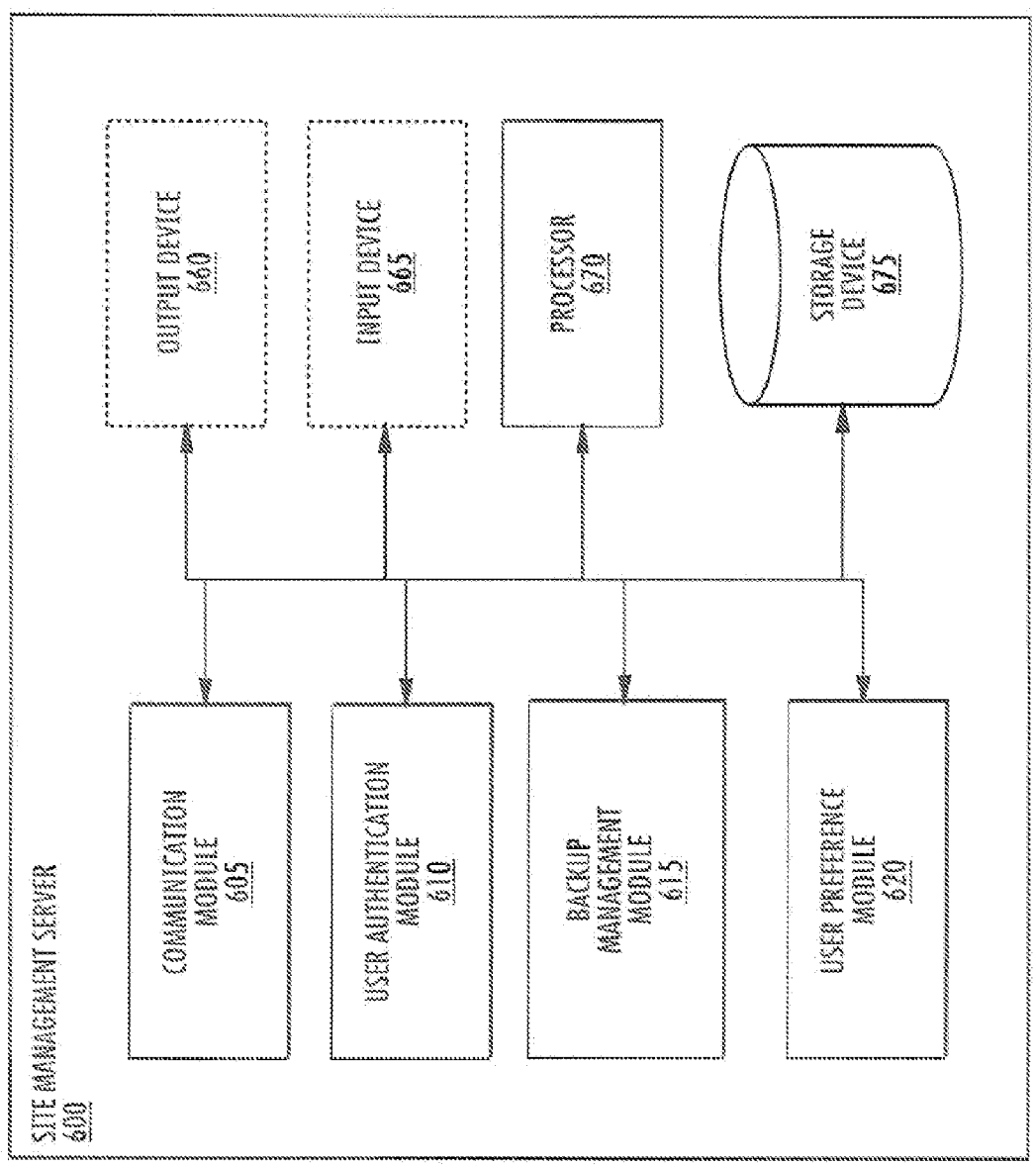
FIG. 6 is a block diagram illustrating an exemplary logical data site management server, according to one exemplary embodiment.

FIG. 6 illustrates an exemplary site management server 600. The site management server 600 includes a communication module 605, a user authentication module 610, a backup management module 615, a user preference module 620, a backup set management module 625, an output device 660, an input device 665, a processor 670, and a storage device 675. The modules and/or devices can be hardware and/or software. The modules and/or devices illustrated in the site management server 600 can, for example, utilize the processor 670 to execute computer executable instructions and/or include a processor to execute computer executable instructions (e.g., an encryption processing unit, a field programmable gate array processing unit, etc.). It should be understood that the site management server 600 can include, for example, other modules, devices, and/or processors known in the art and/or varieties of the illustrated modules, devices, and/or processors. It should be understood that the modules and/or devices illustrated in the site management server 600 can be located within the site management server 600 and/or connected to the site management server 600 (e.g., directly, indirectly, etc.), but outside of the physical components of the management server (e.g., personal computer, mobile device, etc.).

The communication module 605 communicates data to/from the site management server 600. The user authentication module 610 authenticates users to the site management server 600. The backup management module 615 manages and/or controls backups to/from the site management server 600. The user preference module 620 manages preferences of users and/or collects information associated with user selections and/or preferences. In some embodiments, the user preference module 620 manages the backup policies associated with various client devices.

The output device 660 outputs information and/or data associated with the site management server 600 (e.g., information to a printer (not shown), information to a speaker, etc.). The input device 665 receives information associated with the site management server 600 (e.g., instructions from a user, instructions from a computing device, etc.) from a user (not shown) and/or a computing system not shown). The input device 665 can include, for example, a keyboard, a scanner, an enrollment device, a scale, etc.

The processor 670 executes the operating system and/or any other computer executable instructions for the management server (e.g., executes applications, etc.). The site management server 600 can include random access memory (not shown). The random access memory can temporarily store the operating system, the instructions, and/or any other data associated with the management server. The random access memory can include one or more levels of memory storage (e.g., processor register, storage disk cache, main memory, etc.).

The storage device 675 stores the files, user preferences, backup policies, access information, an operating system and/or any other data or program code associated with the site management server 600. The storage device can include a plurality of storage devices. The storage device 675 can include, for example, long-term storage (e.g., a hard drive, a tape storage device, flash memory, etc.), short-term storage (e.g., a random access memory, a graphics memory, etc.), and/or any other type of computer readable storage.

Although FIG. 6 illustrates the exemplary site management server 600, any of the management servers described herein (e.g., data center management server) can include the components and functionality described with respect to the site management server 600.

Figure 7:
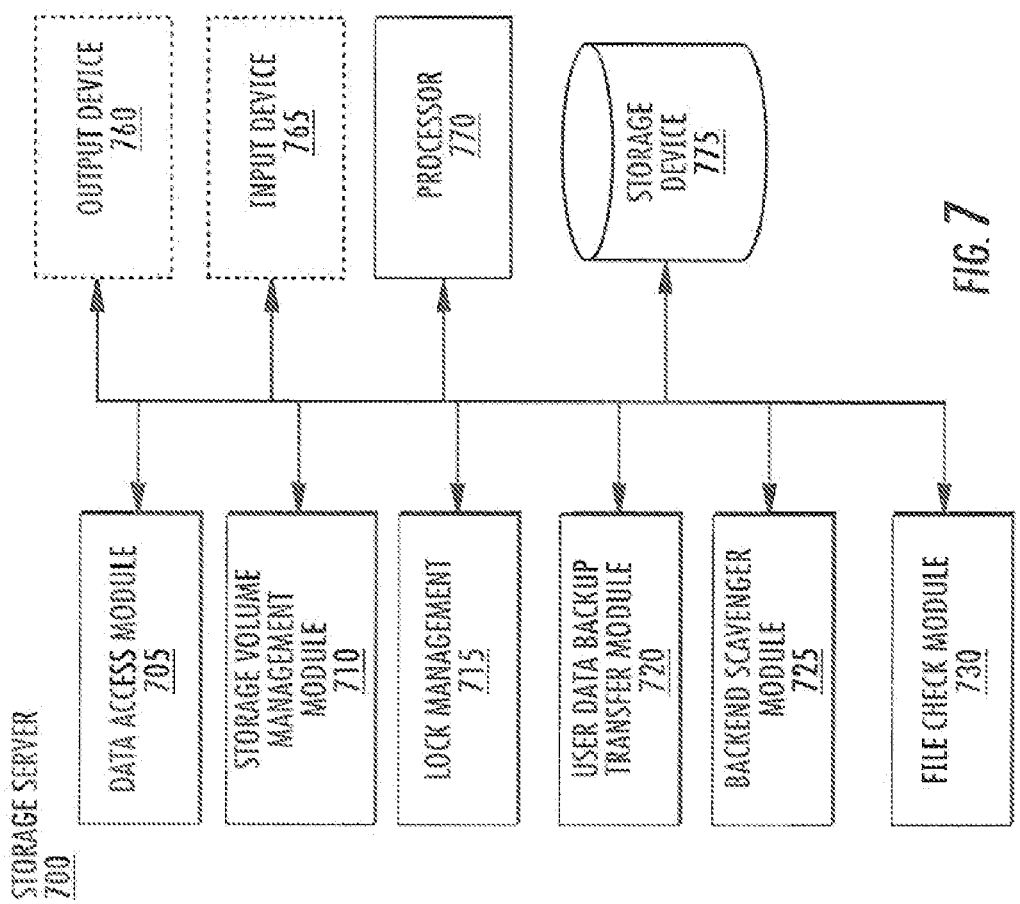
FIG. 7 is a block diagram illustrating an exemplary storage server, according to one exemplary embodiment.

FIG. 7 illustrates an exemplary storage server 700. The storage server 700 includes a data access module 705, a storage volume management module 710, a lock management module 715, a user data backup transfer module 720, a backend scavenger module 725, a file check module 730, an output device 760, an input device 765, a processor 770, and a storage device 775. The modules and/or devices can be hardware and/or software. The modules and/or devices illustrated in the storage server 700 can, for example, utilize the processor 770 to execute computer executable instructions and/or include a processor to execute computer executable instructions (e.g., an encryption processing unit, a field programmable gate array processing unit, etc.). It should be understood that the storage server 700 can include, for example, other modules, devices, and/or processors known in the art and/or varieties of the illustrated modules, devices, and/or processors. It should be understood that the modules and/or devices illustrated in the storage server 700 can be located within the storage server 700 and/or connected to the storage server 700 (e.g., directly, indirectly, etc.), but outside of the physical components of the management server (e.g., personal computer, mobile device, etc.).

The data access module 705 accesses data stored on the storage server 700. The storage volume management module 710 manages user data storages on a storage volume, a logical data site and/or data center.

The lock management module 715 manages locks for locking user data during transfer of user data, maintenance, etc. In some embodiments, the lock management module 715 can manage different types of locks, including a copy lock protecting file copying, an exclusive lock protecting user data from any access to user data, a scavenger lock protecting for read and occasional deletion of expired or corrupt files, a lock protecting user data for reading and writing, a read lock protecting user data for reading, and/or any other type of computer locking mechanism. In some embodiments, the locks can be local to a storage volume, storage server, or logical data site, etc.

The user data backup transfer module 720 manages transfer of user data backup between logical data sites and/or data centers. In some embodiments, the user data backup transfer module 720 transfers user data backup from a source logical data site to a destination logical data site which are located in two different data centers.

The backend scavenger module 725 deletes files no longer required by client for backup. In some embodiments, the client device determines when to purge unwanted files, and updates the backup status files accordingly. Using the updated backup status files, the backend scavenger module 725 deletes files from storage volumes. The backend scavenger module 725 purges data for expired computers, deletes obsolete backup files, requests resend of missing files, performs server file integrity checks, aggregates client log files, gathers server file statistics to logs and database, and/or manages free space in the file system (e.g., NTFS, proprietary file system).

The file check module 730 deletes invalid files (e.g., expired files, suspended files, etc.). The file check module 730 verifies integrity of server files, gathers computer parameters from database, records activity to logs and database, and/or reads storage volume configurations from database, etc. In some embodiments, the file check module 730 moves invalid files to a predetermined folder on each storage volume, and the backend scavenger module 725 performs the actual deletion of the invalid files. In other embodiments, using a proprietary file system, the file check module 730 marks the invalid files for purging, and the file system internally manages the deletion of files marked for purging.

The output device 760 outputs information and/or data associated with the storage server 700 (e.g., information to a printer (not shown), information to a speaker, etc.). The input device 765 receives information associated with the storage server 700 (e.g., instructions from a user, instructions from a computing device, etc.) from a user (not shown) and/or a computing system (not shown). The input device 765 can include, for example, a keyboard, a scanner, an enrollment device, a scale, etc.

The processor 770 executes the operating system and/or any other computer executable instructions for the management server (e.g., executes applications, etc.). The storage server 700 can include random access memory (not shown). The random access memory can temporarily store the operating system, the instructions, and/or any other data associated with the management server. The random access memory can include one or more levels of memory storage (e.g., processor register, storage disk cache, main memory, etc.).

The storage device 775 stores the files, user preferences, backup policies, access information, an operating system and/or any other data or program code associated with the storage server 700. The storage device can include a plurality of storage devices. The storage device 775 can include, for example, long-term storage (e.g., a hard drive, a tape storage device, flash memory, etc.), short-term storage (e.g., a random access memory, a graphics memory, etc.), and/or any other type of computer readable storage.

Although FIG. 7 illustrates the exemplary storage server 700, any of the management servers described herein (e.g., site management server) can include the components and functionality described with respect to the storage server 700.

Figure 8:
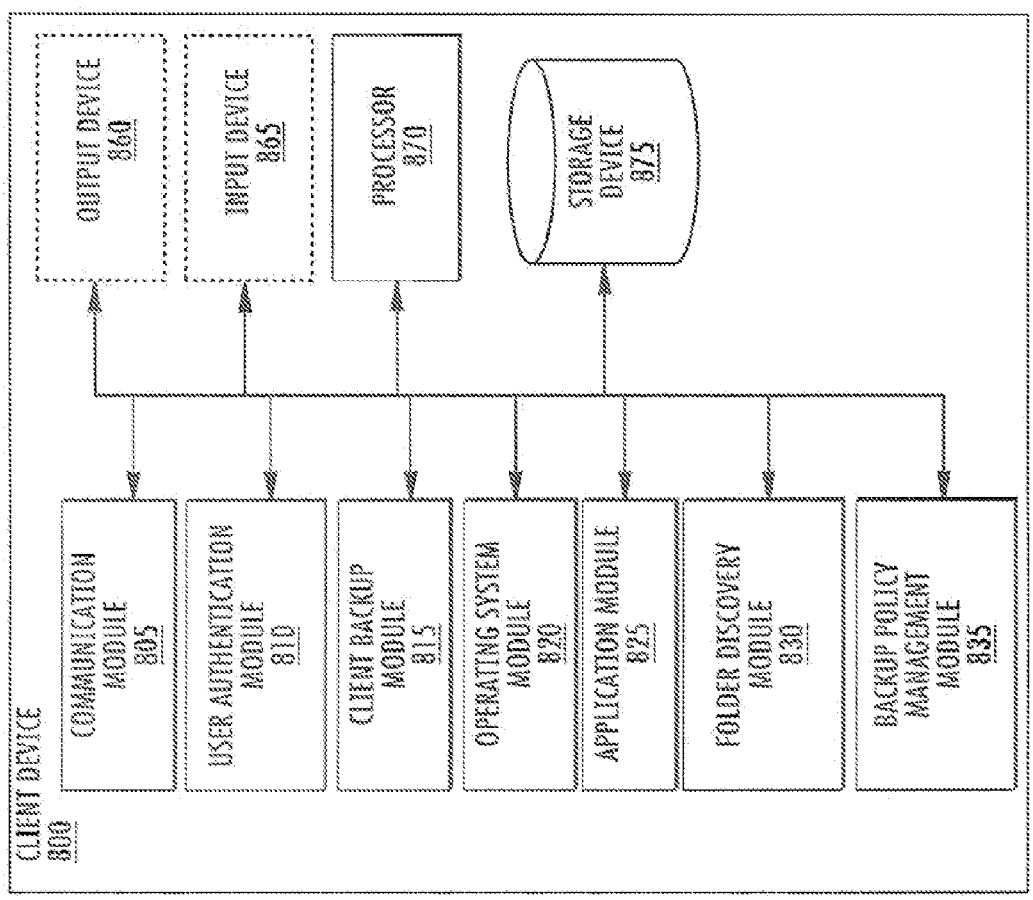
FIG. 8 is a block diagram illustrating an exemplary client device, according to one exemplary embodiment.

FIG. 8 illustrates an exemplary client device 800. The client device 800 includes a communication module 805, a user authentication module 810, a client backup module 815, an operating system module 820, an application module 825, a folder discovery module 830, a backup policy management module 835, an output device 860, an input device 865, a processor 870, and a storage device 875. The modules and/or devices can be hardware and/or software. The modules and/or devices illustrated in the client device can, for example, utilize the processor to execute computer executable instructions and/or include a processor to execute computer executable instructions (e.g., an encryption processing unit, a field programmable gate array processing unit, etc.). It should be understood that the client device 800 can include, for example, other modules, devices, and/or processors known in the art and/or varieties of the illustrated modules, devices, and/or processors. It should be understood that the modules and/or devices illustrated in the client device 800 can be located within the client device 800 and/or connected to the client device 800 (e.g., directly, indirectly, etc.), but outside of the physical components of the client device 800 (e.g., personal computer, mobile device, etc.).

The communication module 805 communicates data and/or information to/from the client device 800. The user authentication module 810 authenticates users for the client device 800 and/or the client backup module. The client backup module 815 backs-up, restores and/or identifies user data for backup and restoration. The operating system module 820 operates an operating system on the client device 800. The application module 825 operates one or more applications on the client device 800. The folder discovery module 830 scans the client device 800 searching for folders satisfying parameters specified in a backup policy associated with the client device 800. The backup policy management module 835 manages the backup policy associated with the client device 800.

The output device 860 outputs information and/or data associated with the client device 800 (e.g., information to a printer (not shown), information to a speaker, etc.). The input device 865 receives information associated with the client device (e.g., instructions from a user, instructions from a computing device, etc.) from a user (not shown) and/or a computing system (not shown). The input device 865 can include, for example, a keyboard, a scanner, an enrollment device, a scale, etc.

The processor 870 executes the operating system and/or any other computer executable instructions for the client device (e.g., executes applications, etc.). The client device 800 can include random access memory (not shown). The random access memory can temporarily store the operating system, the instructions, and/or any other data associated with the client device. The random access memory can include one or more levels of memory storage (e.g., processor register, storage disk cache, main memory, etc.).

The storage device 875 stores the files, user preferences, backup sets, backup policies, access information, an operating system and/or any other data or program code associated with the management server (e.g., site management server, data center management server, etc.). The storage device 875 can include a plurality of storage devices. The storage device 875 can include, for example, long-term storage (e.g., a hard drive, a tape storage device, flash memory, etc.), short-term storage (e.g., a random access memory, a graphics memory, etc.), and/or any other type of computer readable storage. In some embodiments, the storage device 875 includes one or more hard drives.

Figure 9B:
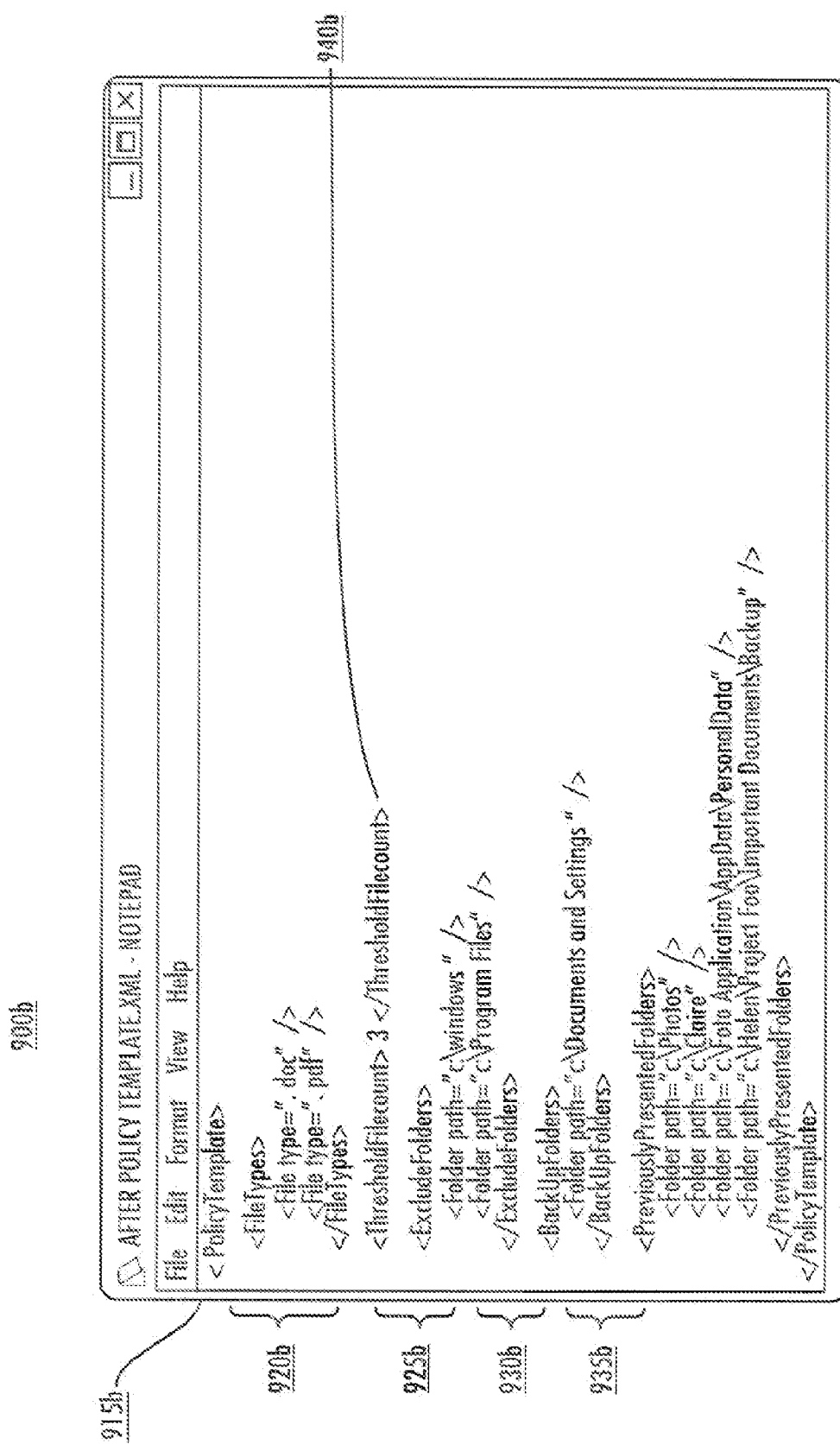

FIGS. 9A-9B illustrate exemplary backup policy templates used by the folder discovery module 830. FIG. 9A illustrates an exemplary backup policy template 900*a*. The backup policy template 900*a* is shown to include a list of file types 920*a* of interest including ".doc" and ".pdf". In some embodiments, file types listed in the backup policy may be considered to have a higher than default priority (e.g. priority higher than zero) such that files of these file types are considered important to the user. The backup policy template 900*a* is shown to further include a threshold file count 940 having a value of three. The backup policy template 900*a* can include a list of excluded folders 925*a* that should be skipped during the search performed by the folder discovery module 830 (e.g. "C:\Windows" and "C:\Program Files"). The list of excluded folders 925*a* are assumed not to have any user-generated content (i.e., have a backup priority of zero). The backup policy template 900*a* includes a list of folders already selected for backup 930*a* (e.g. "C:\Documents and Settings"). During the search, the folder discovery module 830 skips the folders listed in the backup folders list 930*a*.

The backup policy template 900*a* includes a list of folders previously presented to the user 935*a* (e.g. "C:\Photos"). In some embodiments, the list of previously presented folders 935*a* includes a unique identifier (not shown) for a client device 800 associated with the backup policy template 900*a*. In these embodiments, the folder discovery module 830 verifies that the current device matches the client device specified in the backup policy template 900*a*, and will ignore the previously presented folders list if the client device identifiers do not match. The backup policy template 900*a* can include a list of individual files already selected for backup (not shown). For example, if a "Test" folder contains three ".doc" documents and two of the three "word" documents are already selected for backup, then the two "word" documents selected for backup would not be counted towards the required threshold file count (e.g., three). In some embodiments, the list of file types, threshold file count, list of folders being backed up, list of previously presented folders and other configuration parameters can be stored in multiple backup policy templates or other locations. The backup policy template 900*a* can define levels of backup priority for various file types. For example, file types with a higher than default priority may be listed in the types of files of interest in the policy template. The policy template can contain additional configuration parameters (e.g., next scheduled scan time, maximum number of folders that can be presented to a user at a time, individual files selected for backup, individual files to be excluded from the scan, drives to be excluded from the scan, etc.).

Using the backup policy template 900*a*, the folder discovery module 830 searches for folders having at least three ".doc" and/or ".pdf" files, excluding folders listed in the excluded folders list 925*a*, backup folders list 930*a*, and the previously presented folders list 935*a*. In some embodiments, if no folders are listed in the excluded folders list 925*a* in the backup policy template 900*a*, then the folder discovery module 830 does not proceed with searching the storage device 875 for folders having important files not already being backed up.

Figure 13:
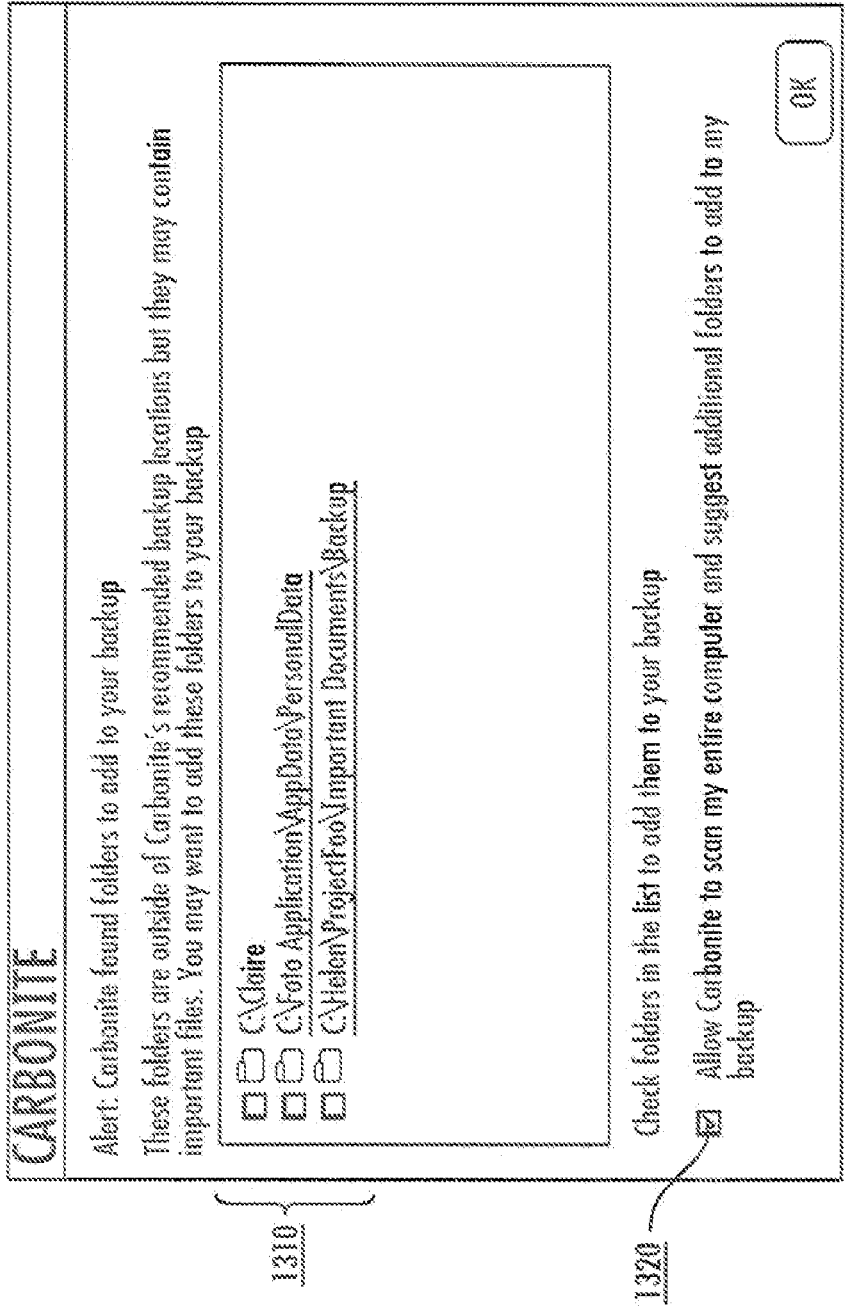
FIG. 13 illustrates an exemplary user interface.

After the folder discovery module 830 finishes searching the storage device 875 for folders storing user-generated content in non-standard locations, the discovered top level folders 1310 are displayed to the user in a dialog 1300 as illustrated in FIG. 13. Once the user selects folders from the list of recommended folders 1310 and/or dismisses the dialog 1300, the backup policy management module 835 updates the backup policy template 900*a* as illustrated in FIG. 9B. The folder discovery module 830 updates the previously presented folders list 935*a* with the list of folders 1310 presented to the user in the dialog 1300 (i.e., regardless of whether the user selects any of the folders 1310 for backup). As illustrated in the backup policy template 900*b*, the previously presented folders list is updated to contain "C:\Claire", "C:\Foto Application\AppData\PersonalDate", and "C:\Helen\Project Foo\Important Documents\Backup". The list of backup folders 930*b* can be updated with the list of folders that the user selected for backup in the interface 1300.

The configuration values that store various lists of folders (e.g., list of excluded folders 925*a*) in the backup policy can accumulate over time and lead to unexpected behavior (e.g., explosion in the size of the policy template). To keep the size of the backup policy under control, the backup policy management module 835 can periodically iterate through the various lists of folders stored in the backup policy, and remove folders that no longer exist on the file system of the client device from the lists of folders in the backup policy. For example, if the user deletes the "C:\Claire" folder 1015*a* from the client device 800, during the next scheduled scan, the backup policy management module 835 will remove the "C:\Claire" folder 1015*a* from the list of previously presented folders 935*b* in the backup policy template 900*b*.

The backup policy templates 900*a* and 900*b* can be in any format including comma separated tile, XML format, binary format. ASCII format, or any other format. The backup policies (e.g., 900*a* and 900*b*) can be maintained and stored on the client device storage device 875. In some embodiments, the client backup module 815 backups up the backup policies to one or more storage servers 700. As a result, the backup policies can be stored on the storage server 775. The contents of the backup policies can be determined by the user preference module 620, and/or the backup policy management module 835. In some embodiments, the user preference module 620 maintains a default backup policy. In some embodiments, the user is allowed to edit the backup policy (e.g., the file types the user considers important for backup). In these embodiments, the user preference module 620 can analyze the backup policy editions made by multiple users and update the backup policies of other users in a similar fashion.

Figure 10A:
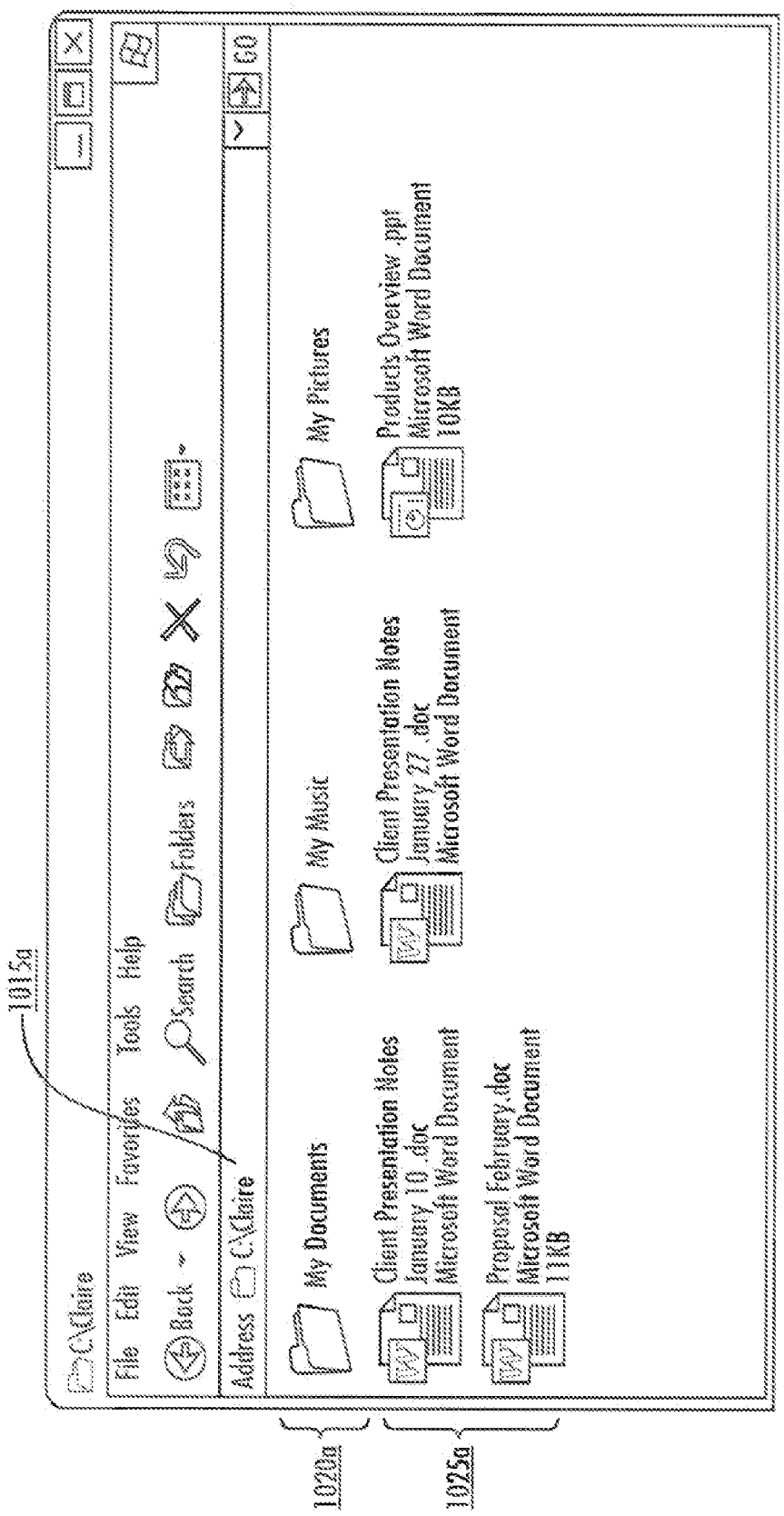
Figure 10B:
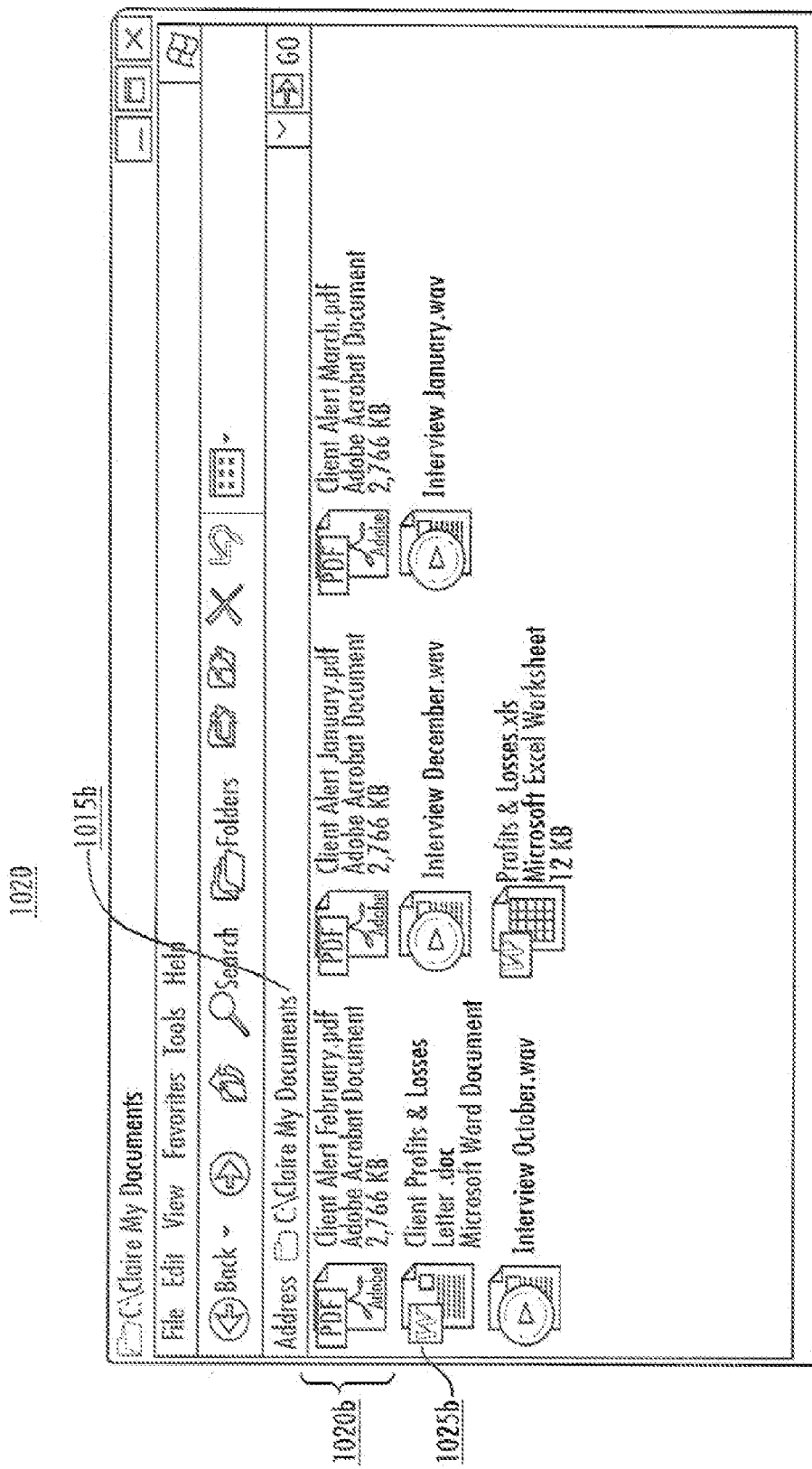

FIGS. 10A-10C illustrate exemplary user created folders in a non-standard location on the client device 800. As illustrated in FIG. 10A, the "C:\Claire" folder 1015a contains three subfolders 1020a, and four individual files 1025 including three Word documents, and a Power Point document. The "C:\Claire" folder 1015a was created by the user on C:\drive which is not a standard location for user files. Accordingly, during backup of the user's files, the "Claire" folder may not be included in the list of folders being backed up.

FIG. 10B and FIG. 10C illustrate two subfolders of the "Claire" folder 1015a. FIG. 10B illustrates a "My Documents" subfolder 1015b of the "Claire" folder 1015a, containing three Adobe Acrobat documents 1020b, one Microsoft Word document 1025b, as well as one Microsoft Excel document and three audio documents. FIG. 10C illustrates a "My Pictures" subfolder 1015c of the "Claire" folder 1015a, containing five "JPEG" documents.

Figure 11B:
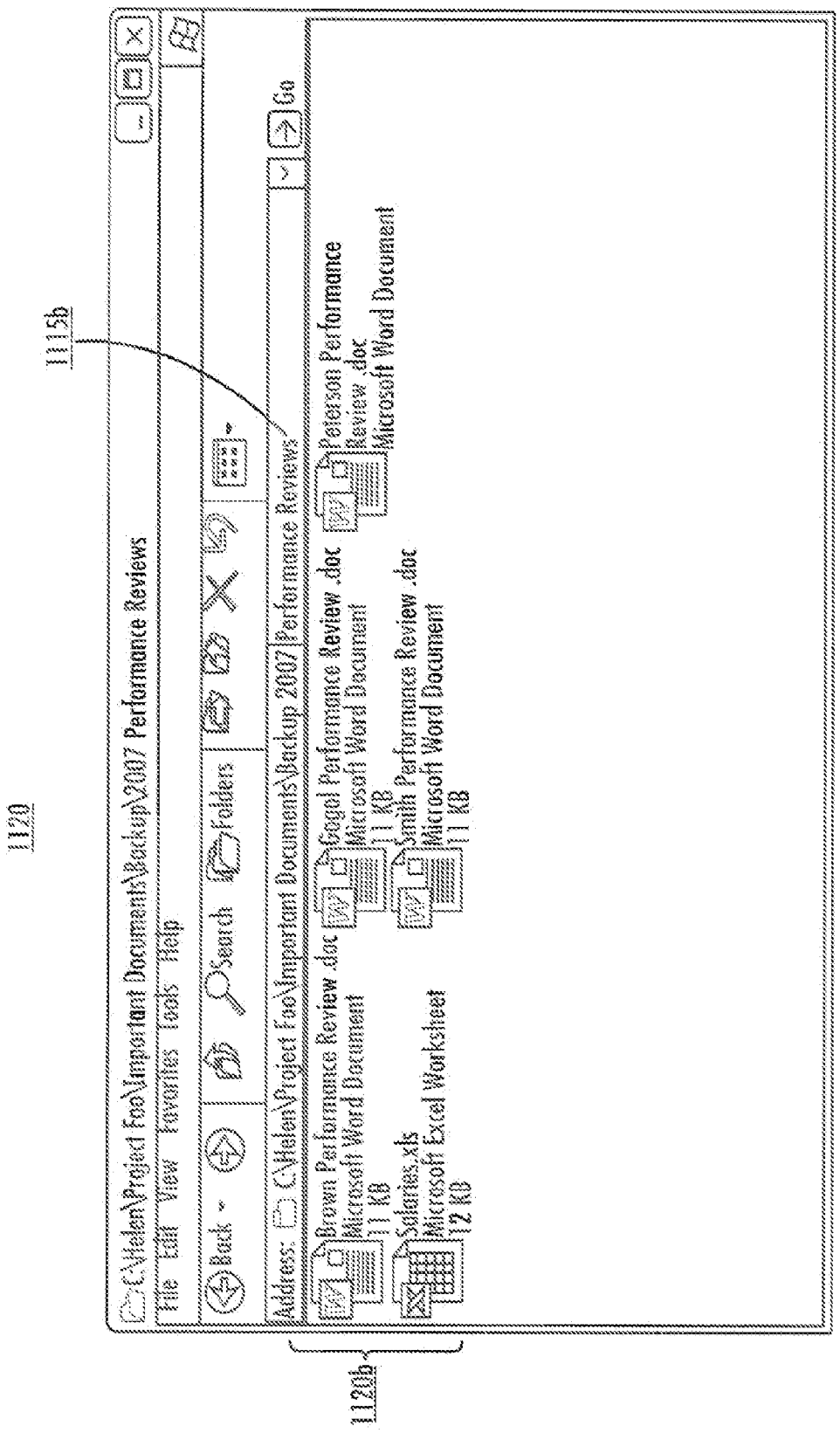

FIGS. 11A-11E illustrate another set of exemplary user created folders in a non-standard location on the client device 800. As illustrated in FIG. 11A, folder "C:\Helen\Project Foo\Important Documents\Backup" 1115a contains five subfolders, and a Microsoft Excel document 1120a. The "Backup" folder 1115a was created by the user on "C:\Helen\Project Foo\Important Documents" folder which is not a standard location for user files. Accordingly, during backup of the user's files, the "Backup" folder 1115a may not be included in the list of folders being backed up and the contents of the "Backup" folder 1115a may be lost (e.g., disk failure).)

Figure 11C:
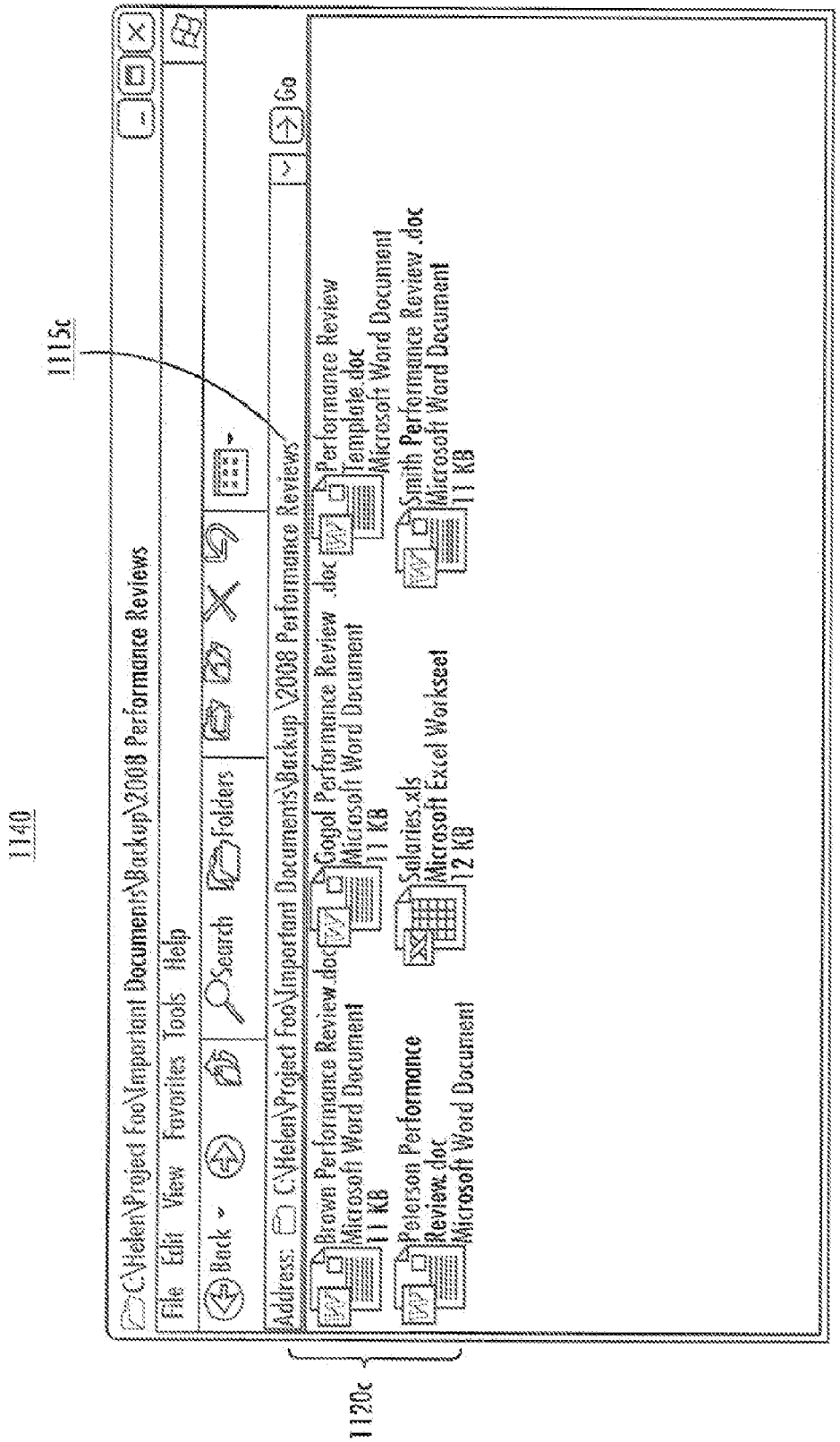
Figure 11D:
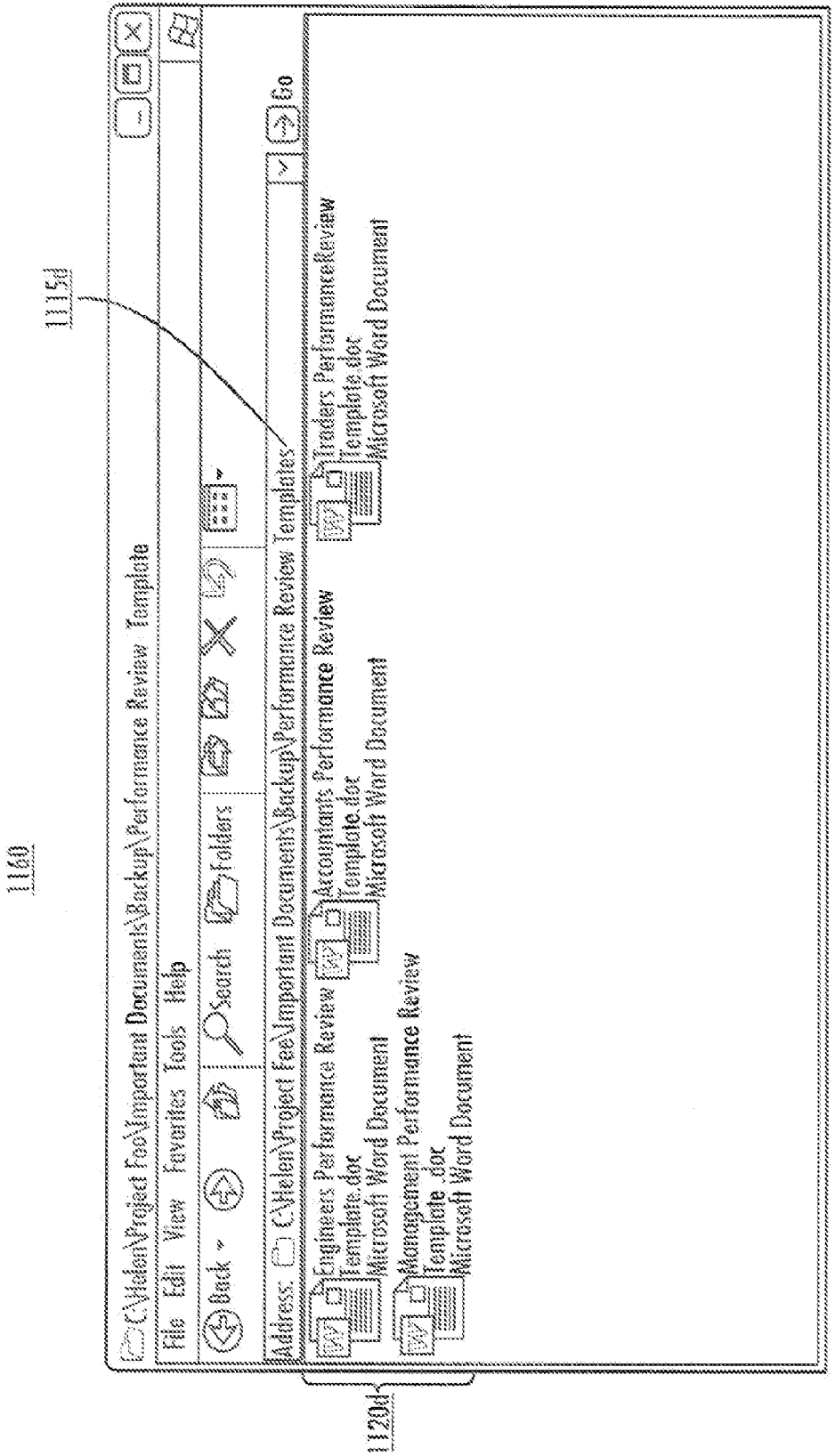
Figure 11E:
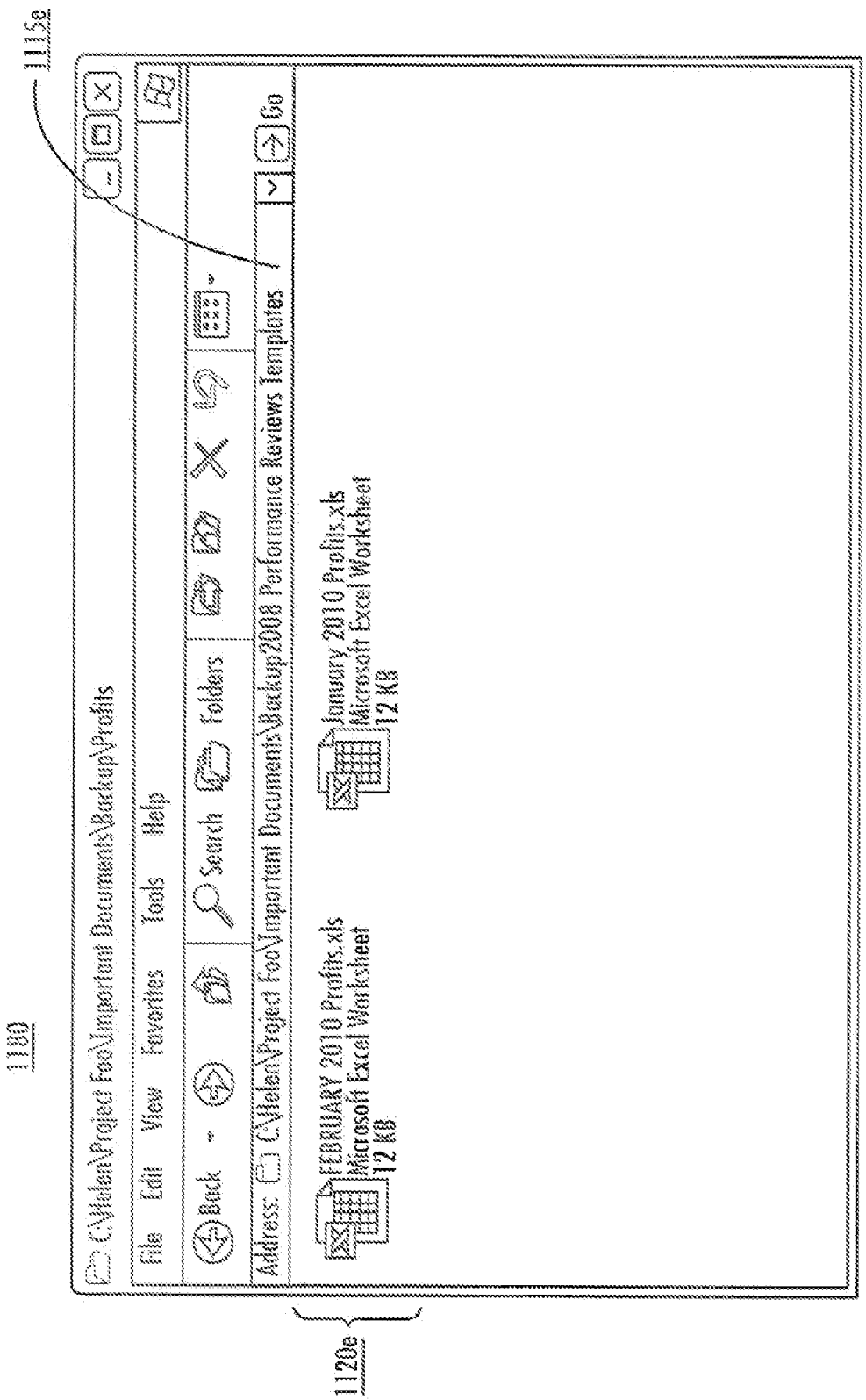

FIG. 11B-11E illustrate four subfolders of the "Backup" folder 1115a. FIG. 11B illustrates a "2007 Performance Reviews" subfolder 1115b of the "Backup" folder 1115a, containing four Microsoft Word documents and a single Microsoft Excel document 1120b. FIG. 11C illustrates a "2008 Performance Reviews" subfolder 1115c of the "Backup" folder 1115a, containing five Microsoft Word documents and a single Microsoft Excel document 1120c. FIG. 11D illustrates a "Performance Review Templates" subfolder 1115d of the "Backup" folder 1115d, containing four Microsoft Word documents, FIG. 11E illustrates a "Profits" subfolder 1115e of the "Backup" folder 1115d, containing two Microsoft Excel documents 1120e.

Figure 12:
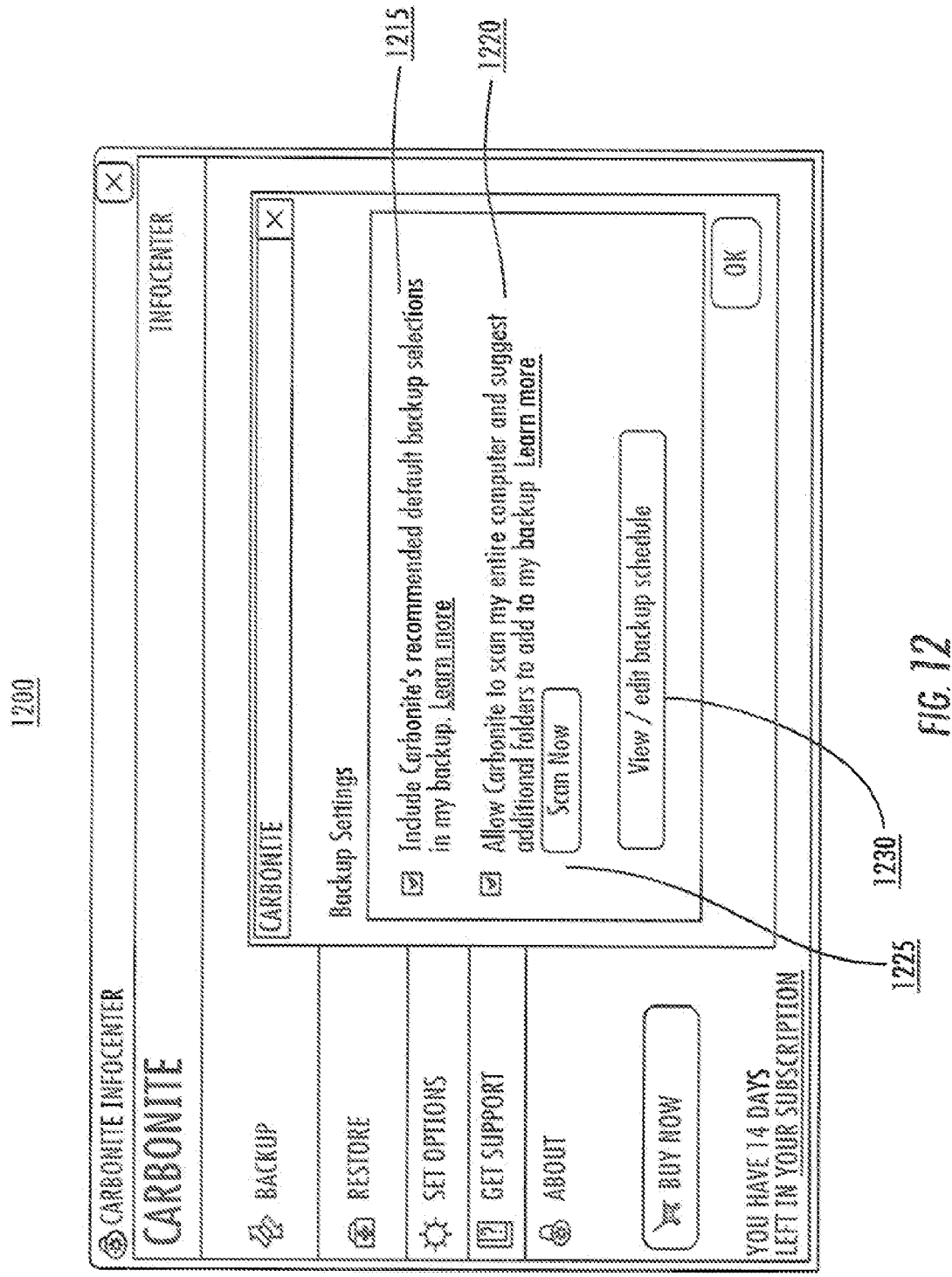
FIG. 12 illustrates an exemplary user interface.

FIG. 12 illustrates an exemplary user interface 1200 allowing the user to update backup settings. The interface 1200 displays a check box 1215 for including recommended default backup selections in the user's backup. In some embodiments, the site management server 600 maintains a set of recommended backup selections. The interface 1200 displays a check box 1220 for allowing the user to enable scanning of the user's computer and suggesting additional folders to be added to backup. The interface 1200 displays a "Scan Now" button 1225, which would force an immediate re-scan of the user's computing device, including folders previously shown to the user during previous scans performed by the folder discovery module 830 of the client device 800 and not selected for backup. To view and edit the backup schedule of the user's computing device, the user can click on the "View/edit backup schedule" button 1230.

FIG. 13 illustrates an exemplary user interface 1300 displaying a list of folders 1310 outside of locations selected for backup. The user selecting the check box 1220 can trigger display of the user interface 1300 to the user. In some embodiments, the list of folders 1310 is advantageously a list of top-level folders reducing the total number of folders displayed in the interface 1300. In some embodiments, selecting any of the folders 1310 would enable the client backup module 815 to backup the selected folders including all their subfolders. The list of folders 1310 is generated by the folder discovery module 830 using a backup policy template associated with the client device 800. For example, using the exemplary backup policy 900a, the folder discovery module 830 found three folders 1310 that have three or more ".doc" or ".pdf" files. In some embodiments, all the files stored in the selected folders will be backed up, including both the files being of the types included in the backup policy (e.g., ".doc", ".pdf"). In other embodiments, only the files of the types explicitly included in the backup policy will be backed up. By unselecting check box 1320, the user can disable any further scanning of the user's computing device 800 for folders that are not already being backed up but potentially storing important documents.

The interface 1300 can be scrollable both vertically, in order to handle a long list of folders, and horizontally, to show a deeply nested folder path. In some embodiments, the check boxes next to each folder 1310 are initially unchecked, and the user can manually check boxes next to the folders that they would like to backup. In other embodiments, the check boxes next to each folder 1310 are checked by default, and the user can manually uncheck them. In other embodiments, a second check box (not shown) can be included next to each folder 1310 indicating whether the user does not want to be prompted about this folder during future scans. In these embodiments, the second checkbox is checked by default for each folder 1310, and the user can manually uncheck the second checkbox so that the future scanning performed by the folder discovery module 830 does not exclude the corresponding folder path.

In some embodiments, after the user selects some or all of folders 1310 to be added to backup, the client back-up module 815 immediately backs up the selected folders. In other embodiments, the client back-up module 815 will back up the selected folders during the next scheduled backup time. In other embodiments, the folder discovery module 830 can perform the first backup of the selected folders.

Once the user dismisses the interface 1300, the backup policy management 835 updates the backup policy associated with client device 800. For example, if the user dismissed the interface 1300 without selecting any folders for backup, the folder discovery module 830 updates the list of previously presented folders 935a in the backup policy template 900a with the list of folders 1310 as illustrated in the backup policy template 900b such that these folders will not be searched by the folder discovery module 830 during the next scan of the client device 800. In another example, if the user selected one or more of the folders 1310 for backup, the folder discovery module 830 updates the list of backup folders 930a to include the selected folders. In some embodiments, the folder discovery module 830 adds all the folders 1310, regardless of whether the user selected any of the folders 1310, to the previously presented folders 935a in the backup policy template 900a.

In some embodiments, the total number of folders shown in the interface 1300 can be limited by a predetermined maximum folder count parameter stored in the backup policy associated with the client device 800. For example, the predetermined maximum folder count parameter can be set to 25. In this embodiment, if the folder discovery module 830 detects more than the predetermined maximum folder count parameter, the interface 1300 displays the maximum number of folders, and the folder discovery module 830 runs again in a shorter interval, instead of waiting until the next scheduled scan time.

In some embodiments, each folder path shown in the interface 1300 is a hyperlink. When the user clicks one of the hyperlinks, a corresponding folder is opened so that the user can view the contents of the folder. The interface 1300 can include a button or a check box to force an immediate rescan, including searching through folders previously shown in the interface 1300 and not selected for backup.

Figure 14:
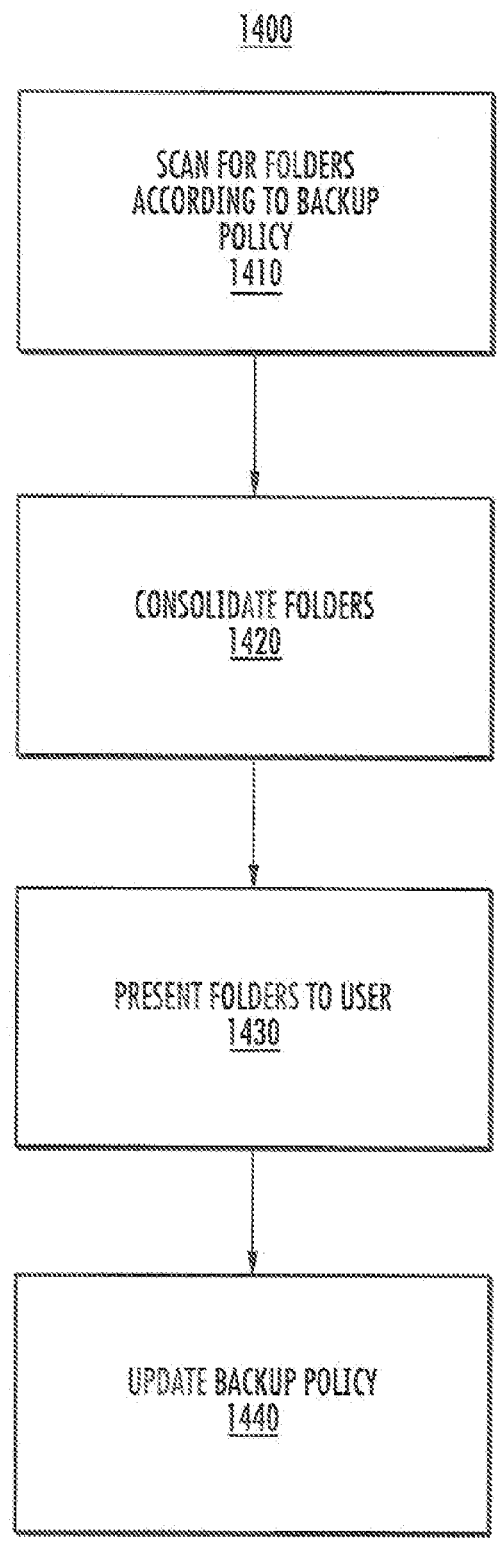
FIG. 14 illustrates a flowchart showing discovery of folders for backup.

In FIG. 14, a flowchart 1400 relating to scanning the client device 800 for folders storing important files is shown, according to an exemplary embodiment. The folder discovery module 830 scans (step 1410) the client device for folders satisfying parameters specified in a backup policy associated with the client device 800. The folder discovery module 830 can scan all drives on the client device 800.

For example, the backup policy associated with the client device 800 is the exemplary backup policy template 900a, in which the file types of interest 920a include ".doc" and ".pdf" file types, the threshold file count 940a is set to three, a list of folders to exclude from the search 925a is specified, a list of folders already being backed up 930a is specified, and a list of folders previously presented to the user to include in backup 935a is specified. Using the backup policy 900a, the folder discovery module 830 scans the client device 800 for folders containing at least the three ".doc" and ".pdf" files. The folder discovery module 830 determines whether the found folder is listed in the list of folders to exclude from the search 925a. The folder discovery module 830 determines whether the found folder is already being backed up using the backup folders list 930a. The folder discovery module 830 determines whether the found folder is in the list of folders already presented to the user 935a (i.e., in the interface 1300 or similar interface). If, for example, the client device 800 includes folders illustrated in FIGS. 10A-C, the folder discovery module 830 discovers the "Claire" folder 1015a because the "Claire" folder 1015a contains the requisite three Word documents, and because the "Claire" folder 1015a was not listed in the list of backed up folders 930a, the list of excluded folders 925a, or the list of previously presented folders 935a.

In some embodiments, when the folder discovery module 830 discovers a folder (e.g., "Claire" folder 1015a) containing at least the minimum number of files of types specified in the backup policy, the folder discovery module 830 does not examine the subfolders of the found folder (e.g., "My Documents" folder 1015b) to determine whether the subfolders contain the required number of files of interest. In these embodiments, even though the "My Documents" folder 1015b also contains four files (i.e., more than three) of file types specified in the backup policy 900a, the folder discovery module 830 does not analyze this subfolder. In these embodiments, the interface 1300 displays the "C:\Claire" folder but not any of the subfolders that contain the minimum required number of important files. In other embodiments, the folder discovery module 830 examines all or some subfolders associated with the found folder, and displays to the user all the folders and their subfolders satisfying the configuration parameters of the backup policy. In these embodiments, selecting a folder for backup in interface 1300 does not cause backup of all the subfolders of the selected folder.

Using the backup policy associated with the client device 800, the folder discovery module 830 finds folders satisfying the parameters specified in the backup policy. The folder discovery module 830 advantageously consolidates (step 1420) or aggregates the discovered list of folders to reduce the list of folders displayed to the user. In some embodiments, when two or more subfolders of a folder satisfy all the required parameters specified in the backup policy, the folder discovery module 830 consolidates the subfolders into the top level folder. For example, the "Backup" folder 1115a illustrated in FIG. 11A does not contain three or more ".doc" or ".pdf" files. However, the "2007 Performance Review" subfolder 1115b contains four ".doc" documents, the "2008 Performance Review" subfolder 1115c contains five ".doc" documents, and the "Performance Review Templates" subfolder 1115d contains four ".doc" documents. In addition, none of the three folders are listed in the excluded folders list 925a, the list of folders being backed up 930a, or the list of folders previously presented 935a. Accordingly, these three subfolders of the "Backup folder" 1115a satisfy all the parameters specified by the backup policy template 900a. The folder discovery module 830 consolidates subfolders into the "Backup" folder 1115a, and presents (1430) the path of the "Backup" folder to the user as illustrated in the interface 1300, instead of presenting the paths of the three subfolders (i.e., "2007 Performance Review" subfolder 1115b path, "2008 Performance Review" subfolder 1115c path, and "Performance Review Templates" subfolder 1115c path).

The user interface 1300 presents (step 1430) the consolidated list of folders discovered by the folder discovery module 830. In some embodiments, before presenting a list of found folders to the user, the folder discovery module 830 checks whether any of the found folders have been selected for backup (e.g., while the scanning was in progress, the user selected additional folders for backup). For example, if the folder discovery module 830 determines that one of the discovered folders has subsequently been selected for backup or if individual files have been selected for backup such that the threshold file count is no longer met, then the folder discovery module 830 strips that folder from the list of folders to be presented to the user.

Once the user dismisses the interface 1300, the backup policy management module 835 updates (step 1440) the backup policy (e.g., backup policy template 900a) associated with the client device 800. If the user selects any of the presented folders in the interface 1300 for backup, the backup policy management module 835 adds these folders to the list of folders already being backed up 930a. The backup policy management module 835 updates the list of folders already presented to the user 935a with all the folders displayed to the user in the interface 1300.

In some embodiments, the folder discovery module 830 performs the scan of the client device 800 on a periodic basis. The folder discovery module 830 can spawn a new thread to perform the scanning on a predetermined periodic basis. For example, the scan (e.g., new thread) can run once a week. In some embodiments, the thread may be anew, long-running, low-priority background thread. When the thread finishes searching for folders of interest, it may record finish time, and put itself to sleep. Each time the thread wakes up, it checks if it is time for a new scan.

The above-described systems and methods can be implemented in digital electronic circuitry, in computer hardware, firmware, and/or software. The implementation can be as a computer program product i.e., a computer program tangibly embodied in an information carrier). The implementation can, for example, be in a machine-readable storage device, for execution by, or to control the operation of data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The communication networks can include, for example, packet-based networks and/or circuit-based networks. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The client device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Moreover, various functions described herein can be implemented in hardware, software, firmware, or any combination thereof. If implemented in software, the functions can be stored on or transmitted over as one or more instructions or code on a computer-readable medium. Computer-readable media can be non-transitory in nature and include both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any physical connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for identifying folder paths for backup, the method comprising:
    scanning, by a folder discovery module executed by a processor of a computing device, a client device for folders;
    identifying, by the folder discovery module, at least one folder on the client device, responsive to the at least one folder matching a pre-defined parameter associated with a backup policy for the client device, the pre-defined parameter comprising a file type and a threshold file count indicating a minimum number of files of the file type;
    generating, by the folder discovery module, a consolidated list of folder paths including each identified folder on the client device; and
    presenting, by an application module executed by the processor, the consolidated list of one or more folder paths to a user;
    wherein identifying at least one folder on the client device further comprises identifying a first folder responsive to the first folder including at least the minimum number of files of the file type.

2. The method of claim 1, further comprising prompting the user to select folders from the consolidated list of one or more folders for backup.

3. The method of claim 2, further comprising receiving a folder path selected by the user from the consolidated list of one or more folder paths; and modifying the backup policy based on the user selection.

4. The method of claim 1,
    wherein identifying at least one folder on the client device further comprises identifying a first folder and second folder, responsive to the first folder and second folder including the number of files matching the pre-defined file type parameter; and
    wherein generating the consolidated list of folder paths further comprises determining a top level folder of the first folder and second folder.

5. The method of claim 4, wherein generating the consolidated list of folder paths further comprises including the top level folder of the first folder and second folder in the list and excluding the first folder and second folder from the list.

6. The method of claim 1, further comprising identifying a folder having a folder path previously presented to the user.

7. The method of claim 6, wherein the consolidated list excludes the folder path previously presented to the user.

8. The method of claim 1, further comprising identifying a folder having a folder path of a folder backed up by a client backup module.

9. The method of claim 8, wherein the consolidated list excludes the folder path of the backed up folder.

10. The method of claim 1, further comprising identifying a folder having an excluded folder path determined to be excluded from backup.

11. The method of claim 10, wherein the consolidated list excludes the excluded folder path.

12. The method of claim 1, further comprising updating the backup policy with the consolidated list of folder paths.

13. The method of claim 1, further comprising:
    backing up the folders selected by the user based on the backup policy to a storage management server.

14. A system for identifying folder paths for backup, the system comprising:
    a device comprising a processor executing a folder discovery module and an application module,
    wherein the folder discovery module is configured to
        scan a client device for folders,
        identify at least one folder on the client device, responsive to the at least one folder matching a pre-defined parameter associated with a backup policy for the client device, the pre-defined parameter comprising a file type and a threshold file count indicating a minimum number of files of the file type,
        generate a consolidated list of folder paths including each identified folder on the client device; and
    wherein the application module is configured to present the consolidated list of one or more folder paths to a user;
    wherein identifying at least one folder on the client device further comprises identifying a first folder responsive to the first folder including at least the minimum number of files of the file type.

15. The system of claim 14,
wherein the application module is further configured to prompt the user to select folders from the consolidated list of one or more folders for backup; and
wherein the folder discovery module is further configured to receive a folder path selected by the user from the consolidated list of one or more folder paths, and modify the backup policy based on the user selection.

16. The method of claim 14, wherein the folder discovery module is further configured to
identify a first folder and second folder on the client device, responsive to the first folder and second folder including the number of files matching the pre-defined file type parameter,
determine a top level folder of the first folder and second folder, and
include the determined top level folder in the consolidated list and exclude the first folder and second folder from the list.

17. The system of claim 14, wherein the folder discovery module is further configured to identify a folder having a folder path of a folder backed up by a client backup module, and wherein the folder discovery module is further configured to exclude the folder path of the backed up folder from the consolidated list.

18. The system of claim 14, the folder discovery module is further configured to update the backup policy with the consolidated list of folder paths.

* * * * *